United States Patent
Hsu et al.

(10) Patent No.: US 9,479,574 B2
(45) Date of Patent: *Oct. 25, 2016

(54) GLOBAL SERVER LOAD BALANCING

(71) Applicant: Brocade Communications Systems, Inc., San Jose, CA (US)

(72) Inventors: Ivy Pei-Shan Hsu, Pleasanton, CA (US); David Chun-Ying Cheung, Cupertino, CA (US); Rajkumar Ramniranjan Jalan, Saratoga, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 460 days.

This patent is subject to a terminal disclaimer.

(21) Appl. No.: 13/925,670

(22) Filed: Jun. 24, 2013

(65) Prior Publication Data

US 2014/0040478 A1 Feb. 6, 2014

Related U.S. Application Data

(63) Continuation of application No. 12/496,560, filed on Jul. 1, 2009, now Pat. No. 8,504,721, which is a continuation of application No. 11/741,480, filed on Apr. 27, 2007, now Pat. No. 7,581,009, which is a continuation of application No. 09/670,487, filed on Sep. 26, 2000, now Pat. No. 7,454,500.

(51) Int. Cl.
*H04L 29/08* (2006.01)

(52) U.S. Cl.
CPC ....... *H04L 67/1002* (2013.01); *H04L 67/1008* (2013.01); *H04L 67/1021* (2013.01); *H04L 67/1012* (2013.01)

(58) Field of Classification Search
CPC combination set(s) only.
See application file for complete search history.

(56) References Cited

U.S. PATENT DOCUMENTS

| 5,031,094 A | 7/1991 | Toegel et al. |
| 5,359,593 A | 10/1994 | Derby et al. |
| 5,530,872 A | 6/1996 | Smeltzer et al. |
| 5,539,883 A | 7/1996 | Allon et al. |
| 5,867,706 A | 2/1999 | Martin et al. |

(Continued)

FOREIGN PATENT DOCUMENTS

| EP | 1128613 A2 | 8/2001 |
| WO | 01/39003 A1 | 5/2001 |
| WO | 01/93530 A2 | 12/2001 |

OTHER PUBLICATIONS

U.S. Appl. No. 60/169,502, filed Dec. 7, 1999, by Yee Jang.

(Continued)

*Primary Examiner* — Abdullahi E Salad
(74) *Attorney, Agent, or Firm* — Kilpatrick Townsend & Stockton LLP

(57) ABSTRACT

A global server load balancing (GSLB) switch serves as a proxy to an authoritative DNS communicates with numerous site switches which are coupled to host servers serving specific applications. The GSLB switch receives from site switches operational information regarding host servers within the site switches neighborhood. When a client program requests a resolution of a host name, the GSLB switch, acting as a proxy of an authoritative DNS, returns one or more ordered IP addresses for the host name. The IP addresses are ordered using metrics that include the information collected from the site switches. In one instance, the GSLB switch places the address that is deemed "best" at the top of the list.

9 Claims, 3 Drawing Sheets

(56) References Cited

U.S. PATENT DOCUMENTS

| | | |
|---|---|---|
| 5,918,017 A | 6/1999 | Attanasio et al. |
| 5,948,061 A | 9/1999 | Merriman et al. |
| 5,951,634 A | 9/1999 | Sitbon et al. |
| 6,006,269 A | 12/1999 | Phaal |
| 6,006,333 A | 12/1999 | Nielsen |
| 6,012,088 A | 1/2000 | Li et al. |
| 6,078,956 A | 6/2000 | Bryant et al. |
| 6,092,178 A | 7/2000 | Jindal et al. |
| 6,112,239 A | 8/2000 | Kenner et al. |
| 6,115,752 A | 9/2000 | Chauhan |
| 6,119,143 A | 9/2000 | Dias et al. |
| 6,128,279 A | 10/2000 | O'Neil et al. |
| 6,128,642 A | 10/2000 | Doraswamy et al. |
| 6,134,588 A | 10/2000 | Guenthner et al. |
| 6,148,410 A | 11/2000 | Baskey et al. |
| 6,157,649 A | 12/2000 | Peirce et al. |
| 6,167,445 A | 12/2000 | Gai et al. |
| 6,167,446 A | 12/2000 | Lister et al. |
| 6,178,160 B1 | 1/2001 | Bolton et al. |
| 6,182,139 B1 | 1/2001 | Brendel |
| 6,185,619 B1 | 2/2001 | Joffe et al. |
| 6,195,691 B1 | 2/2001 | Brown |
| 6,205,477 B1 | 3/2001 | Johnson et al. |
| 6,233,604 B1 | 5/2001 | Van Horne et al. |
| 6,249,801 B1 | 6/2001 | Zisapel et al. |
| 6,256,671 B1 | 7/2001 | Stentzsch |
| 6,260,070 B1 | 7/2001 | Shah |
| 6,262,976 B1 | 7/2001 | McNamara |
| 6,286,039 B1 | 9/2001 | Van Horne et al. |
| 6,286,047 B1 | 9/2001 | Ramanathan et al. |
| 6,304,913 B1 | 10/2001 | Rune |
| 6,317,775 B1 | 11/2001 | Coile et al. |
| 6,324,177 B1 | 11/2001 | Howes et al. |
| 6,324,580 B1 | 11/2001 | Jindal et al. |
| 6,327,622 B1 | 12/2001 | Jindal et al. |
| 6,330,605 B1 | 12/2001 | Christensen et al. |
| 6,336,137 B1 | 1/2002 | Lee et al. |
| 6,378,068 B1 | 4/2002 | Foster et al. |
| 6,381,627 B1 | 4/2002 | Kwan et al. |
| 6,389,462 B1 | 5/2002 | Cohen et al. |
| 6,393,473 B1 | 5/2002 | Chu |
| 6,405,252 B1 | 6/2002 | Gupta et al. |
| 6,411,998 B1 | 6/2002 | Bryant et al. |
| 6,427,170 B1 | 7/2002 | Sitaraman et al. |
| 6,434,118 B1 | 8/2002 | Kirschenbaum |
| 6,438,652 B1 | 8/2002 | Jordan et al. |
| 6,446,121 B1* | 9/2002 | Shah .................. H04L 41/5009 709/203 |
| 6,449,657 B2 | 9/2002 | Stanbach et al. |
| 6,470,389 B1 | 10/2002 | Chung et al. |
| 6,473,802 B2 | 10/2002 | Masters |
| 6,480,508 B1 | 11/2002 | Mwikalo et al. |
| 6,487,555 B1 | 11/2002 | Bharat et al. |
| 6,490,624 B1 | 12/2002 | Sampson et al. |
| 6,513,061 B1 | 1/2003 | Ebata et al. |
| 6,542,964 B1 | 4/2003 | Scharber |
| 6,549,944 B1 | 4/2003 | Weinberg et al. |
| 6,567,377 B1 | 5/2003 | Vepa et al. |
| 6,578,066 B1 | 6/2003 | Logan et al. |
| 6,578,077 B1 | 6/2003 | Rakoshitz et al. |
| 6,601,084 B1 | 7/2003 | Bhaskaran et al. |
| 6,606,643 B1 | 8/2003 | Emens et al. |
| 6,611,861 B1 | 8/2003 | Schairer et al. |
| 6,647,009 B1 | 11/2003 | Kubota et al. |
| 6,665,702 B1 | 12/2003 | Zisapel et al. |
| 6,671,275 B1 | 12/2003 | Wong et al. |
| 6,681,232 B1 | 1/2004 | Sistanizadeh et al. |
| 6,681,323 B1 | 1/2004 | Fontanesi et al. |
| 6,684,250 B2 | 1/2004 | Anderson et al. |
| 6,691,165 B1 | 2/2004 | Bruck et al. |
| 6,697,368 B2 | 2/2004 | Chang et al. |
| 6,701,368 B1 | 3/2004 | Channapragada et al. |
| 6,718,387 B1 | 4/2004 | Gupta et al. |
| 6,725,253 B1 | 4/2004 | Okano et al. |
| 6,735,218 B2 | 5/2004 | Chang et al. |
| 6,745,241 B1 | 6/2004 | French et al. |
| 6,748,416 B2 | 6/2004 | Carpenter et al. |
| 6,751,616 B1 | 6/2004 | Chan |
| 6,754,699 B2 | 6/2004 | Swildens et al. |
| 6,754,706 B1* | 6/2004 | Swildens ................ H04L 29/06 709/219 |
| 6,760,775 B1 | 7/2004 | Anerousis |
| 6,772,211 B2 | 8/2004 | Lu et al. |
| 6,775,230 B1 | 8/2004 | Watanabe et al. |
| 6,779,017 B1 | 8/2004 | Lamberton et al. |
| 6,785,704 B1 | 8/2004 | McCanne |
| 6,789,125 B1 | 9/2004 | Aviani et al. |
| 6,795,434 B1 | 9/2004 | Kumar et al. |
| 6,795,858 B1 | 9/2004 | Jain et al. |
| 6,795,860 B1 | 9/2004 | Shah |
| 6,801,949 B1 | 10/2004 | Bruck et al. |
| 6,810,411 B1 | 10/2004 | Coughlin et al. |
| 6,826,198 B2 | 11/2004 | Turina et al. |
| 6,839,700 B2 | 1/2005 | Doyle et al. |
| 6,850,984 B1 | 2/2005 | Kalkunte et al. |
| 6,862,627 B1 | 3/2005 | Cheshire |
| 6,874,152 B2 | 3/2005 | Vermeire et al. |
| 6,879,995 B1 | 4/2005 | Chinta et al. |
| 6,880,000 B1 | 4/2005 | Tominaga et al. |
| 6,883,028 B1 | 4/2005 | Johnson et al. |
| 6,898,633 B1 | 5/2005 | Lyndersay et al. |
| 6,901,072 B1 | 5/2005 | Wong |
| 6,901,081 B1 | 5/2005 | Ludwig |
| 6,920,498 B1 | 7/2005 | Gourlay et al. |
| 6,928,485 B1 | 8/2005 | Krishnamurthy et al. |
| 6,944,678 B2 | 9/2005 | Lu et al. |
| 6,950,848 B1 | 9/2005 | Yousefi'zadeh |
| 6,963,914 B1 | 11/2005 | Breibart et al. |
| 6,963,917 B1 | 11/2005 | Callis et al. |
| 6,968,389 B1 | 11/2005 | Menditto et al. |
| 6,985,956 B2 | 1/2006 | Luke et al. |
| 6,987,763 B2 | 1/2006 | Rochberger et al. |
| 6,996,551 B2 | 2/2006 | Hellerstein et al. |
| 6,996,615 B1 | 2/2006 | McGuire |
| 6,996,616 B1 | 2/2006 | Leighton et al. |
| 7,000,007 B1 | 2/2006 | Valenti |
| 7,020,698 B2 | 3/2006 | Andrews et al. |
| 7,020,714 B2 | 3/2006 | Kalyanaraman et al. |
| 7,028,083 B2 | 4/2006 | Levine et al. |
| 7,032,010 B1 | 4/2006 | Swildens et al. |
| 7,032,031 B2 | 4/2006 | Jungck et al. |
| 7,036,039 B2 | 4/2006 | Holland |
| 7,047,300 B1 | 5/2006 | Oehrke et al. |
| 7,058,706 B1 | 6/2006 | Iyer et al. |
| 7,058,717 B2 | 6/2006 | Chao et al. |
| 7,062,562 B1 | 6/2006 | Baker et al. |
| 7,062,642 B1 | 6/2006 | Langrind et al. |
| 7,080,138 B1 | 7/2006 | Baker et al. |
| 7,082,102 B1 | 7/2006 | Wright |
| 7,086,061 B1 | 8/2006 | Joshi et al. |
| 7,089,293 B2 | 8/2006 | Grosner et al. |
| 7,099,915 B1 | 8/2006 | Tenereillo et al. |
| 7,114,008 B2 | 9/2006 | Jungck et al. |
| 7,117,269 B2 | 10/2006 | Lu et al. |
| 7,117,530 B1* | 10/2006 | Lin .................... H04L 12/4641 726/14 |
| 7,124,188 B2 | 10/2006 | Mangipudi et al. |
| 7,126,910 B1 | 10/2006 | Sridhar |
| 7,127,713 B2 | 10/2006 | Davis et al. |
| 7,136,932 B1 | 11/2006 | Schneider |
| 7,139,242 B2 | 11/2006 | Bays |
| 7,177,933 B2 | 2/2007 | Foth |
| 7,185,052 B2 | 2/2007 | Day |
| 7,187,687 B1 | 3/2007 | Davis et al. |
| 7,194,553 B2 | 3/2007 | Lucco et al. |
| 7,197,547 B1 | 3/2007 | Miller et al. |
| 7,206,806 B2 | 4/2007 | Pineau |
| 7,213,068 B1 | 5/2007 | Kohli et al. |
| 7,215,637 B1 | 5/2007 | Ferguson et al. |
| 7,225,236 B1 | 5/2007 | Puthiyandyil et al. |
| 7,225,272 B2 | 5/2007 | Kelley et al. |
| 7,240,015 B1 | 7/2007 | Karmouch et al. |
| 7,240,100 B1 | 7/2007 | Wein et al. |
| 7,254,626 B1 | 8/2007 | Kommula et al. |

(56) References Cited

U.S. PATENT DOCUMENTS

| | | | |
|---|---|---|---|
| 7,257,642 B1 | 8/2007 | Bridger et al. | |
| 7,260,645 B2 | 8/2007 | Bays | |
| 7,266,117 B1 | 9/2007 | Davis | |
| 7,277,954 B1 | 10/2007 | Stewart et al. | |
| 7,289,519 B1 | 10/2007 | Liskov | |
| 7,296,088 B1 | 11/2007 | Padmanabhan et al. | |
| 7,321,926 B1 | 1/2008 | Zhang et al. | |
| 7,330,908 B2 | 2/2008 | Jungck | |
| 7,383,288 B2 | 6/2008 | Miloushev et al. | |
| 7,423,977 B1 | 9/2008 | Joshi | |
| 7,441,045 B2 * | 10/2008 | Skene ............... | G06F 9/505 709/201 |
| 7,447,739 B1 | 11/2008 | Cunetto et al. | |
| 7,454,500 B1 | 11/2008 | Hsu et al. | |
| 7,478,148 B2 | 1/2009 | Neerdaels | |
| 7,483,374 B2 | 1/2009 | Nilakantan et al. | |
| 7,496,651 B1 | 2/2009 | Joshi | |
| 7,523,181 B2 | 4/2009 | Swildens et al. | |
| 7,573,886 B1 | 8/2009 | Ono | |
| 7,574,508 B1 | 8/2009 | Kommula | |
| 7,581,006 B1 | 8/2009 | Lara et al. | |
| 7,581,009 B1 | 8/2009 | Hsu et al. | |
| 7,584,262 B1 | 9/2009 | Wang et al. | |
| 7,584,301 B1 | 9/2009 | Joshi | |
| 7,587,487 B1 | 9/2009 | Gunturu | |
| 7,594,262 B2 | 9/2009 | Hanzlik et al. | |
| 7,653,700 B1 | 1/2010 | Bahl et al. | |
| 7,657,629 B1 | 2/2010 | Kommula | |
| 7,676,576 B1 | 3/2010 | Kommula | |
| 7,734,683 B1 | 6/2010 | Bergenwall et al. | |
| 7,756,965 B2 | 7/2010 | Joshi | |
| 7,792,113 B1 | 9/2010 | Foschiano et al. | |
| 7,840,678 B2 | 11/2010 | Joshi | |
| 7,860,964 B2 | 12/2010 | Brady et al. | |
| 7,885,188 B2 | 2/2011 | Joshi | |
| 7,899,899 B2 | 3/2011 | Joshi | |
| 7,899,911 B2 | 3/2011 | Jensen et al. | |
| 7,925,713 B1 | 4/2011 | Day et al. | |
| 7,949,757 B2 | 5/2011 | Joshi | |
| 8,024,441 B2 | 9/2011 | Kommula | |
| 8,248,928 B1 | 8/2012 | Wang et al. | |
| 8,280,998 B2 | 10/2012 | Joshi | |
| 8,504,721 B2 | 8/2013 | Hsu et al. | |
| 8,510,428 B2 | 8/2013 | Joshi | |
| 8,527,639 B1 | 9/2013 | Liskov et al. | |
| 8,549,148 B2 | 10/2013 | Devarapalli | |
| 8,862,740 B2 | 10/2014 | Joshi | |
| 8,949,850 B2 | 2/2015 | Joshi et al. | |
| 9,015,323 B2 | 4/2015 | Kommula | |
| 2001/0049741 A1 | 12/2001 | Skene et al. | |
| 2002/0023089 A1 | 2/2002 | Woo | |
| 2002/0026551 A1 | 2/2002 | Kamimaki et al. | |
| 2002/0038360 A1 | 3/2002 | Andrews et al. | |
| 2002/0049778 A1 | 4/2002 | Bell et al. | |
| 2002/0055939 A1 | 5/2002 | Nardone et al. | |
| 2002/0059170 A1 | 5/2002 | Vange | |
| 2002/0059464 A1 | 5/2002 | Hata et al. | |
| 2002/0062372 A1 | 5/2002 | Hong et al. | |
| 2002/0078233 A1 | 6/2002 | Biliris et al. | |
| 2002/0087722 A1 | 7/2002 | Datta et al. | |
| 2002/0091840 A1 | 7/2002 | Pulier et al. | |
| 2002/0107841 A1 | 8/2002 | Hellerstein et al. | |
| 2002/0112036 A1 | 8/2002 | Bohannon et al. | |
| 2002/0120743 A1 | 8/2002 | Shabtay et al. | |
| 2002/0120763 A1 | 8/2002 | Miloushev et al. | |
| 2002/0124080 A1 | 9/2002 | Leighton et al. | |
| 2002/0124096 A1 | 9/2002 | Loguinov et al. | |
| 2002/0133601 A1 | 9/2002 | Kennamer et al. | |
| 2002/0150048 A1 | 10/2002 | Ha et al. | |
| 2002/0154600 A1 | 10/2002 | Ido et al. | |
| 2002/0156916 A1 | 10/2002 | Watanabe | |
| 2002/0186698 A1 | 12/2002 | Ceniza | |
| 2002/0188862 A1 | 12/2002 | Trethewey et al. | |
| 2002/0194324 A1 | 12/2002 | Guha | |
| 2002/0194335 A1 | 12/2002 | Maynard | |
| 2003/0018796 A1 | 1/2003 | Chou et al. | |
| 2003/0031185 A1 | 2/2003 | Kikuchi et al. | |
| 2003/0035430 A1 | 2/2003 | Islam et al. | |
| 2003/0065711 A1 | 4/2003 | Acharya et al. | |
| 2003/0065762 A1 | 4/2003 | Stolorz et al. | |
| 2003/0065763 A1 | 4/2003 | Swildens et al. | |
| 2003/0074472 A1 | 4/2003 | Lucco et al. | |
| 2003/0105797 A1 | 6/2003 | Dolev et al. | |
| 2003/0115283 A1 | 6/2003 | Barbir et al. | |
| 2003/0135509 A1 | 7/2003 | Davis et al. | |
| 2003/0154239 A1 | 8/2003 | Davis et al. | |
| 2003/0177240 A1 | 9/2003 | Gulko et al. | |
| 2003/0202511 A1 | 10/2003 | Sreejith et al. | |
| 2003/0210686 A1 | 11/2003 | Terrell et al. | |
| 2003/0210694 A1 | 11/2003 | Jayaraman et al. | |
| 2003/0229697 A1 | 12/2003 | Borella | |
| 2004/0019680 A1 | 1/2004 | Chao et al. | |
| 2004/0024872 A1 | 2/2004 | Kelley et al. | |
| 2004/0039798 A1 | 2/2004 | Hotz et al. | |
| 2004/0039847 A1 | 2/2004 | Persson et al. | |
| 2004/0064577 A1 | 4/2004 | Dahlin et al. | |
| 2004/0078487 A1 | 4/2004 | Cernohous et al. | |
| 2004/0194102 A1 | 9/2004 | Neerdaels | |
| 2004/0249939 A1 | 12/2004 | Amini et al. | |
| 2004/0249971 A1 | 12/2004 | Klinker | |
| 2004/0255018 A1 | 12/2004 | Taraci | |
| 2004/0259565 A1 | 12/2004 | Lucidarme | |
| 2005/0002410 A1 | 1/2005 | Chao et al. | |
| 2005/0021883 A1 | 1/2005 | Shishizuka et al. | |
| 2005/0033858 A1 | 2/2005 | Swildens et al. | |
| 2005/0060418 A1 | 3/2005 | Sorokopud | |
| 2005/0060427 A1 | 3/2005 | Phillips et al. | |
| 2005/0086295 A1 | 4/2005 | Cunningham et al. | |
| 2005/0149531 A1 | 7/2005 | Srivastava | |
| 2005/0169180 A1 | 8/2005 | Ludwig | |
| 2005/0190695 A1 | 9/2005 | Phaal | |
| 2005/0207417 A1 | 9/2005 | Ogawa et al. | |
| 2005/0286416 A1 | 12/2005 | Shimonishi et al. | |
| 2006/0020715 A1 | 1/2006 | Jungck | |
| 2006/0036743 A1 | 2/2006 | Deng et al. | |
| 2006/0039374 A1 | 2/2006 | Belz et al. | |
| 2006/0045082 A1 | 3/2006 | Fertell et al. | |
| 2006/0143300 A1 | 6/2006 | See et al. | |
| 2006/0167894 A1 | 7/2006 | Wunner | |
| 2006/0209689 A1 | 9/2006 | Nakano et al. | |
| 2007/0168448 A1 | 7/2007 | Garbow et al. | |
| 2007/0168547 A1 | 7/2007 | Krywaniuk | |
| 2007/0180113 A1 | 8/2007 | Van Bemmel | |
| 2007/0195761 A1 | 8/2007 | Tatar et al. | |
| 2007/0208877 A1 | 9/2007 | Kelley et al. | |
| 2007/0233891 A1 | 10/2007 | Luby et al. | |
| 2008/0002591 A1 | 1/2008 | Ueno | |
| 2008/0016233 A1 | 1/2008 | Schneider | |
| 2008/0031141 A1 | 2/2008 | Lean et al. | |
| 2008/0037420 A1 | 2/2008 | Tang | |
| 2008/0123597 A1 | 5/2008 | Arbol et al. | |
| 2008/0144784 A1 | 6/2008 | Limberg | |
| 2008/0147866 A1 | 6/2008 | Stolorz et al. | |
| 2008/0159141 A1 | 7/2008 | Soukup et al. | |
| 2008/0195731 A1 | 8/2008 | Harmel et al. | |
| 2008/0207200 A1 | 8/2008 | Fein et al. | |
| 2008/0225710 A1 | 9/2008 | Raja et al. | |
| 2008/0304423 A1 | 12/2008 | Chuang et al. | |
| 2010/0010991 A1 | 1/2010 | Joshi | |
| 2010/0011120 A1 | 1/2010 | Kommula | |
| 2010/0011126 A1 | 1/2010 | Hsu et al. | |
| 2010/0061236 A1 | 3/2010 | Joshi | |
| 2010/0082787 A1 | 4/2010 | Kommula et al. | |
| 2010/0095008 A1 | 4/2010 | Joshi | |
| 2010/0115133 A1 | 5/2010 | Joshi | |
| 2010/0121932 A1 | 5/2010 | Joshi et al. | |
| 2010/0153558 A1 | 6/2010 | Kommula | |
| 2010/0223621 A1 | 9/2010 | Joshi et al. | |
| 2010/0251008 A1 | 9/2010 | Swildens | |
| 2010/0293296 A1 | 11/2010 | Hsu et al. | |
| 2010/0299427 A1 | 11/2010 | Joshi | |
| 2011/0122771 A1 | 5/2011 | Joshi | |
| 2011/0191459 A1 | 8/2011 | Joshi | |
| 2011/0264798 A1 | 10/2011 | Joshi | |

(56) References Cited

U.S. PATENT DOCUMENTS

| | | |
|---|---|---|
| 2012/0096166 A1 | 4/2012 | Devarapalli et al. |
| 2012/0324089 A1 | 12/2012 | Joshi |
| 2013/0173784 A1 | 7/2013 | Wang et al. |

OTHER PUBLICATIONS

U.S. Appl. No. 60/182,812, filed Feb. 16, 2000, by Skene.
U.S. Appl. No. 60/347,481, filed Jan. 22, 2002, by Tsimelzon et al.
U.S. Appl. No. 61/393,796, filed Oct. 15, 2010, by Devarapalli et al.
U.S. Appl. No. 13/229,380, filed Sep. 9, 2011 by Joshi.
Bestavros, Azer, "Client-Server Computing, WWW Traffic Reduction and Load Balancing Through Server-Based Caching," Jan.-Mar. 1997, pp. 56-67, IEEE Concurrency.
Paul, Arindam et al., "Balancing Web Server Load for Adaptable Video Distribution," 2000, pp. 469-476, IEEE.
Venkataramani, A., et al., "TCP Nice: A Mechanism for Background Transfer," Proceedings of the Fifth Symposium on Operating Systems Design and Implementation (OSDI'02), ISBN:1-931971-06-4, 329-343, 2002, 19 pages.
"Configuring the CSS Domain Name Service," Cisco Documentation, at URL: http://www.ciscosystems.com, Dec. 2000, 13 pages, Cisco Systems Inc., printed on Apr. 2, 2008.
Albitz, P., Etal., "DNS and BIND in a Nutshell," DNS and Binds in a Nutshell Handbook, 1992, pp. 214-215, O'Reilly & Associates, Sebastopol, CA.
"Alteon WebSystems Introduces New Layer 4—Switching Technology That Speeds User Access to Internet Servers, ACElerate 5 Directs User Requests to Best Server Anywhere in the World," Press Release, at URL:http:web.archive.org/web/20000919190409/www.alteonwebsystems.com/press/releases/1998/120798.asp, Dec. 7, 1998, pp. 1-4, Alteon WebSystems, Inc., printed on Nov. 5, 2002.
Ariyapperuma et al., "Security Vulnerabilities in DNS and DNS-SEC", Second international Conference on Availability, Information Security Group, Reliability and Security, Apr. 10-13, 2007, 8 pages. IEEE.
"Enhancing Web User Experience With Global Server Load Balancing," at URL: http://www.alteon.com, Jun. 1999, title page and pp. 1-7, Alteon WebSystems, Inc.
"PCD White Paper," Mar. 2001, pp. 1-8, AlteonWebSystems.
Cardellini, et al., "Dynamic Load Balancing on Web-server Systems," IEEE Internet Computing, May-Jun. 1999, pp. 1-24, vol. 3 No. 3, IEEE.
Delgadillo, "Cisco Distributed Director," White Paper, 1999, at URL: http://www-europe.cisco.warp/public/751/distdir/dd_wp.htm, (19 pages) with Table of Contents for TeleConf99 (16 pages).
Cisco Systems, "Cisco LocalDirector Version 1.6.3 Release Notes," copyright 1997, 52 pages.
Bernardo et al., "Scalability Issues in Telecommunications Services," Conftele'99, 1999, pp. 409-413.
Buyya, "High Performance Cluster Computing: Architectures and Systems," Book, copyright 1999, vol. 1, chapter 14, 27 pages.
Schemers, "Ibnamed: A Load Balancing Name Server in Perl," Ninth System Administration Conference (LISA '95), Sep. 17-22, 1995, 13 pages, Monterey CA.
Goldszmidt, et al., "Load Distribution for Scalable Web Servers: Summer Olympics 1996—A case Study," published 1997, 10 pages.
"Use F5 Networks' 3DNS Controller to Supercharge Standard DNS Capabilities," F5 Networks, Jul. 1999, 3 pages.
"Foundry ServerIron Installation and Configuration Guide," Aug. 15, 2000, at URL:http://www.foundrynetworks.com/techdocs/SI/index.html, 784 pages.
"3-DNS Reference Guide," 3-DNS, Dell Computer Corporation, copyright 2002, version 4.2, 261 pages.
Doeringer et al., "Routing on Longest-Matching Prefixes," IEEE/ACM Transactions on Networking, pp. 86-97, Feb. 1996, vol. 4, No. 1, IEEE.
Foundry Networks, Inc., "Server Load Balancing in Today's Web-enabled Enterprises," Apr. 2002, pp. 1-10, Foundry Networks, Inc.
Genova et al., "Challenges in URL Switching for Implementing Globally Distributed Web Sites," 2000, pp. 89-94, IEEE.
Genova et al., "Challenges to URL Switching for Implementing Globally Distributed Web Sites," pp. 9, Aug. 11, 2000 (PowerPoint Presentation).
Pistoia, et al., "IBM WebSphere Performance Pack: Load Balancing with IBM SecureWay Network Dispatcher," Oct. 1999, First edition, Chapter 1, "IBM WebSphere Performance Pack Concepts," (pp. i-vii and 3-26), Chapter 2, "IBM SecureWay Network Dispatcher Concepts," (pp. 27-54), Chapter 4, "ND Basic Scenarios," (pp. 81-162), Chapter 8, "Wide Area Network Dispatcher Support," (pp. 211-242), at URL: http://www-3.ibm.com/software/webservers/edgeserver/library.html, International Business Machines Corporation.
"SecureWay Network Dispatcher User's Guide, Version 2.1 for AIX, Solaris and Windows NT," Third Edition Mar. 1999, Chapter 3, "Introducing IBM's SecureWay Network Dispatcher," (pp. 15-28), Chapter 4, "Planning for the Dispatcher Component," (pp. 29-36), Chapter 9, "Planning for Interactive Session Support Component," (pp. 85-94), Chapter 10, "Configuring the Interactive Session Support Component," (pp. 95-108), Chapter 11, Operating and Managing SecureWay Network Dispatcher, (pp. 109-120), Appendix C, "Command References for ISS", (pp. 163-176), Appendix E, "Sample Configuration Files," (pp. 179-196), at URL: http://www-3.ibm.com/software/webservers/edgeserver/library.html, International Business Machines Corporation.
Krapf, E., "Alteon's Global Server Load Balancing," Business Communications Review, at URL: http://www.bcr.com/bcrmag/1999/01/p60.asp, Jan. 1999, pp. 60, printed on Oct. 25, 2002.
"Alteon Personal Content Director," © 2001, 4 pages, Nortel Networks.
Yerxa, G., "ACElerate on Fast Track for Load-Balancing,"at URL: http://www.networkcomputing.com/1005/1005sp2.html, Mar. 8, 1999, pp. 1-4, printed on Nov. 5, 2002.
"BIG-IP Global Traffic Manager Datasheet—Optimize Application Delivery Across Your Globally Distributed Data Centers," 2009, 8 pages, F5 Networks, Seattle WA.
"Keeping Up with Multi-Service Applications," A F5 Network, Inc. White Paper Document, Jan. 2006, 8 pages, F5 Networks, Inc.
"NetScaler Global Server Load Balancing for Presentation Server and Access Gate way (All Editions) Deployments" Design Consideration NetScaler 8.0, 2007, 16 pages, Citrix Systems, Inc. Fort Lauderdale, FL.
"The Global Server Load Balancing Primer," A Cisco Systems, Inc. White Paper Document, 1992-2004, 20 pages, Cisco Systems, Inc. San Jose, CA.
Stalvig, "Disaster Recovery: Not Just Planning for the Worst," A F5 Networks, Inc. White Paper, Feb. 2008, 16 pages, F5 Networks, Inc, Seattle, WA.
"Foundry Networks Announces Application Aware Layer 7 Switching on ServerIron Platform," Mar. 1999, 4 pages.
CMP Media LLC, "VeriSign DNSSEC Interop Lab Adds Brocade, A10 Networks, BlueCat Networks," Jun. 29, 2010, can be retrieved from http://www.darkreading.com/story/showArticle.jhtml?articleID=225701776, 3 pages.
National Institute of Standards and Technology (NIST), "Secure Domain Name System (DNS) Deployment Guide," Special Publication 800-81, May 2006, 103 pages.
Network Working Group, Request for Comments (RFC) 4035, "Protocol Modifications for the DNS Security Extensions," Mar. 2005, 55 pages.
Network Working Group, Request for Comments (RFC) 4034, "Resource Records for the DNS Security Extensions," Mar. 2005, 31 pages.
Network Working Group, Request for Comments (RFC) 4033, "DNS Security Introduction and Requirements," Mar. 2005, 22 pages.
A10 Networks, Inc., "A10 Networks Announces Unique and Wide Ranging Customrer-Driven Functionality for AX Series Application Delivery Controllers," News Release, Oct. 18, 2010, from http://www.a10networks.com/news/2010/101018-AX_Series_2.6.php, 2 pages.

(56) References Cited

OTHER PUBLICATIONS

Silva, "DNSSEC: The Antidote to DNS Cache Poisoning and Other DNS Attackes," F5 Technical Brief, copyright 2009, 10 pages, F5 Networks.
Meyer, et al., "F5 and Infoblox DNS Integrated Architecture: Offering a Complete Scalable, Secure DNS Solution," F5 Technical Brief, copyright 2010, 18 pages, F5 Networks.
"Domain Name System Security Extension," Wikipedia, Oct. 22, 2010, 17 pages.
ASKF5 Knowledge Base Release Note: 3-DNS Controller, version 4.5; Software release date Oct. 30, 2002; Updated date Mar. 5, 2007, Exhibit B; 19 pages.
F5 Networks, "Newest Wide Area Traffic Management Solution Enables Enterprises to Meet Global e-Business Objectives," Feb. 19, 2002, Business Wire; Exhibit C, 4 pages.
F5 IT agility your way Release Note: 3-DNS Controller, Release Note; Feb. 13, 2001; Exhibit D, 23 pages.
Huang et al., "A DNS Reflection Method for Global Traffic Management; 2010 with internal cite to 3-DNS Reference White Paper F5 Networks, Inc." 2002, Exhibit E, 7 pages + 2 page date confirmation.
IDS citing Delgadillo K., "Cisco Distributed Director." in CISCO U.S. Appl. No. 09/294,837. (IDS received at the USPTO on Jul. 27, 1999 and placed in file of unpublished patent application.).
Delgadillo, K. "Cisco Distributed Director." CISCO White Papers—Posted Mon Apr. 12, 1999, Public Availability Unknown. Information Disclosure Statement submitted on Apr. 12, 2004, during prosecution of U.S. Pat. No. 7,308,475 (U.S. Appl. No. 10/431,394); Exhibit A, 5 pages.
CISCO, "Configuring a DRP Server Agent", pp. 1-20, Published Jul. 6, 1999 (updated Oct. 11, 2006).
Release Note: 3-DNS Reflection Method for Glogal Traffic Management: 2010 with internal cite to 3-DNS Reference White Paper F5 Networks, Inc., 2002, 6 pages.
Skene et al., "Method and System for Balancing Load Distribution on a Wide Area Network," U.S. Appl. No. 09/459,815, filed Dec. 13, 1999, 59 pages.
Table of Contents for 2nd Conference on Telecommunications (ConfTele'99), Apr. 15-16, 1999, 9 pages.
Skene et al., "Method and System for Name Server Load Balancing," U.S. Appl. No. 60/182,812, filed Feb. 16, 2000, 16 pages.
Tsimelzon et al., "Java application framework for an internet content delivery network," U.S. Appl. No. 60/347,481, filed Jan. 11, 2002, 26 pages.
Information Disclosure Statement filed on Apr. 12, 2004, for U.S. Pat. No. 7,308,475, 5 pages.
Release Note: 3-DNS Controller, version 4.2, Feb. 13, 2002, 23 pages.
Huang et al., "A DNS Reflection Method for Global Traffic Management," Proceedings USENIX Annual Technical Conference (ATC'10), 2010, 7 pages.
Lin, "VPN Tunnel Balancer," U.S. Appl. No. 60/169,502, filed Dec. 7, 1999, 7 pages.
Foundry Networks, Inc., "Foundry ServerIron Installation and Configuration Guide," May 2000, Table of Contents through Chapter 5, 225 pages.
Foundry Networks, Inc., "Foundry ServerIron Installation and Configuration Guide," May 2000, Chapter 6 through 10, 207 pages.
Foundry Networks, Inc., "Foundry ServerIron Installation and Configuration Guide," May 2000, Chapter 11 through Appendix C, 352 pages.
Ethernet, Overview of Ethernet Ethernet—Standards and Implementation IEEE Standards, retrieved Jul. 12, 2012 from URL <http://highteck.net/EN/Ethernet/Ethernet.html>, 40 pages.
Zhou, "Web Server Load Balancers", 2000, Windows IT Pro, http://sindowstipro.com/networking/web-server-load-balancers, 7 pages.
Hasenstein, "IP Address Translation", 1997, http://www.csn.tu.chemnitz.de/HyperNews/get/linux-ip-nat-html, 50 pages.
Hasenstein, "Linux IP Network Address Translation", Dec. 2003, Linux IP NAT Forum, http://www.hasenstein/com/HyperNews/get/linux-ip-nat.html, 12 pages.
Bourke, "Server Load Balancing", 2001, O'Reilly & Associates, Inc., 182 pages.
Advisory Action in Ex Parte Reexamination for Control No. 90/011,765 mailed on Jul. 13, 2012, 13 pages.
Final Office Action for Control No. 95/011,766, mailed on Jul. 17, 2012, 46 pages.
Non-Final Office Action for Inter Partes Reexamination for Control No. 95/001,824, mailed on Jul. 17, 2012, 31 pages.
Advisory Action for Ex Parte Reexamination for Control No. 90/011,761 mailed on Jul. 17, 2012, 10 pages.
Advisory Action for Ex Parte Reexamination for Control No. 90/011,760 mailed on Jul. 17, 2012, 10 pages.
Advisory Action in Ex Parte Reexamination for Control No. 90/011,765 mailed on Jul. 20, 2012, 11 pages.
Petition Dismissal Decision for Inter Partes Reexamination Control No. 95/001,827 mailed on Aug. 22, 2012, 5 pages.
Petition Dismissal Decision for Inter Partes Reexamination Control No. 95/001,826 mailed on Aug. 22, 2012, 5 pages.
Non-Final Office Action for U.S. Appl. No. 10/305,823, mailed on Jan. 3, 2007, 13 pages.
Notice of Allowance for U.S. Appl. No. 10/206,580, Mailed Jan. 11, 2007, 17 pages.
Non-Final Office Action for U.S. Appl. No. 10/305,823, Mailed Jan. 12, 2006, 16 pages.
Final Office Action for U.S. Appl. No. 10/376,903, mailed on Jan. 12, 2007, 8 pages.
Notice of Allowance for U.S. Appl. No. 10/377,364, mailed on Jan. 12, 2010, 5 pages.
Final Office Action for U.S. Appl. No. 11/707,697, mailed on Jan. 12, 2010, 22 pages.
Notice of Allowance for U.S. Appl. No. 12/787,779, mailed on Jan. 12, 2011, 48 pages.
Non-Final Office Action for U.S. Appl. No. 95/001,824, mailed on Jan. 12, 2012, 20 pages.
Non-Final Office Action for Control No. 95/001,822, mailed on Jan. 12, 2012, 23 pages.
Final Office Action for U.S. Appl. No. 12/496,560, mailed on Jan. 28, 2011, 10 pages.
Terminal Disclaimer for U.S. Appl. No. 11/741,480, filed Jan. 29, 2008, 1 page.
Non-Final Office Action for U.S. Appl. No. 12/177,021, mailed on Jan. 29, 2010, 8 pages.
Non-Final Office Action for Control No. 95/001,807 mailed on Jan. 31, 2012, 23 pages.
Non-Final Office Action for U.S. Appl. No. 12/272,618, mailed on Feb. 4, 2010, 14 pages.
Non-Final Office Action for U.S. Appl. No. 10/214,921, mailed on Feb. 7, 2006, 7 pages.
Non-Final Office Action for Control No. 95/001,826, mailed on Feb. 7, 2012, 21 pages.
Notice of Allowance for U.S. Appl. No. 13/023,292, mailed on Feb. 13, 2012, 85 pages.
Non-Final Office Action for U.S. Appl. No. 12/635,371, mailed on Feb. 15, 2012, 10 pages.
Non-Final Office Action for Control No. 90/011,770, mailed on Feb. 16, 2012, 37 pages.
Non-Final Office Action for U.S. Appl. No. 10/376,903, mailed on Feb. 20, 2008, 10 pages.
Non-Final Office Action for U.S. Appl. No. 10/924,552, mailed Feb. 27, 2008, 30 pages.
Final Office Action for U.S. Appl. No. 12/272,618, mailed on Feb. 28, 2012, 26 pages.
Non-Final Office Action for U.S. Appl. No. 11/707,697, mailed Mar. 3, 2009, 41 pages.
Non-Final Office Action for U.S. Appl. No. 10/376,903, mailed on Mar. 4, 2009, 8 pages.
Examiner's Response to Appeal Brief for U.S. Appl. No. 10/305,823, mailed on Mar. 4, 2009, 26 pages.
Notice of Allowance for U.S. Appl. No. 10/839,919, mailed on Mar. 5, 2008, 17 pages.

(56) References Cited

OTHER PUBLICATIONS

Notice of Allowance for U.S. Appl. No. 10/211,822, mailed Mar. 7, 2006, 8 pages.
Final Office Action for U.S. Appl. No. 10/206,580, mailed Mar. 9, 2006, 12 pages.
Non-Final Office Action for Control No. 95/001,827, mailed on Feb. 13, 2012, 21 pages.
Final Office Action for U.S. Appl. No. 12/635,371, mailed on Mar. 16, 2011, 33 pages.
Final Office Action for Ex Parte Reexamination for Control No. 90/011,760, mailed Mar. 21, 2012, 15 pages.
Final Office Action for U.S. Appl. No. 10/305,823, mailed on Mar. 24, 2008, 18 pages.
Non-Final Office Action for U.S. Appl. No. 10/377,364, mailed on Mar. 26, 2007, 14 pages.
Ex Parte Reexamination Interview Summary for Control No. 90/011,761, mailed on Mar. 26, 2012, 2 pages.
Final Office Action for Ex Parte Reexamination for Control No. 90/011,761, mailed Mar. 26, 2012, 16 pages.
Ex Parte Reexamination Interview Summary for Control No. 90/011,770, mailed Mar. 27, 2012, 3 pages.
Notice of Allowance for U.S. Appl. No. 10/214,921, mailed on Apr. 3, 2009, 10 pages.
Notice of Allowance for U.S. Appl. No. 12/938,232, filed Apr. 7, 2011, 51 pages.
Final Office Action for U.S. Appl. No. 10/377,364, mailed on Apr. 9, 2008, 15 pages.
Notice of Allowance for U.S. Appl. No. 12/353,701, mailed on Apr. 9, 2010, 5 pages.
Notice of Allowance for U.S. Appl. No. 11/741,480, Mailed Apr. 10, 2009, 7 pages.
Ex Parte Reexamination Interview Summary for Control No. 90/011,772, mailed Apr. 10, 2012, 3 pages.
Applicant Interview Summary of Examiner Interview of Apr. 10, 2012, for Ex Parte Reexamination Proceedings for Control No. 90/011,772, 5 pages.
Final Office Action for U.S. Appl. No. 10/674,627, mailed on Apr. 11, 2008, 17 pages.
Office Communication Regarding Prior Art Relied Upon in the Rejection of Claims Under Appeal, for U.S. Appl. No. 10/305,823, mailed on Apr. 13, 2009, 2 pages.
Final Office Action for U.S. Appl. No. 11/707,697, mailed on Apr. 20, 2011, 7 pages.
Final Office Action in Ex Parte Reexamination for Control No. 90/011,763, mailed Apr. 25, 2012, 21 pages.
Applicant Interview Summary of Examiner Interview of Apr. 26, 2012, for Ex Parte Reexamination Proceedings for Control No. 90/011,770, 2 pages.
Non-Final Office Action for U.S. Appl. No. 11/741,480, Mailed Apr. 29, 2008, 10 pages.
Non-Final Office Action for U.S. Appl. No. 09/670,487, Mailed May 3, 2006, 21 pages.
Action Closing Prosecution for Inter Partes Reexamination for Control No. 95/001,822, mailed on May 5, 2012, 46 pages.
Notice of Allowance for U.S. Appl. No. 10/839,919, mailed on May 14, 2009, 19 pages.
Notice of Allowance for U.S. Appl. No. 12/496,560, mailed on May 16, 2011, 12 pages.
Final Office Action in Ex Parte Reexamination for Control No. 90/011,765, mailed on May 16, 2012, 59 pages.
Final Office Action for Control No. 90/011,772, mailed on May 17, 2012, 53 pages.
Notice of Allowance for U.S. Appl. No. 13/023,292, mailed on May 18, 2012, 25 pages.
Non-Final Office Action for U.S. Appl. No. 11/429,177, mailed on May 19, 2011, 87 pages.
Notice of Allowance for U.S. Appl. No. 10/924,552, Mailed May 30, 2008, 20 pages.
Notice of Allowance for U.S. Appl. No. 13/023,292, mailed on Jun. 4, 2012, 22 pages.
Non-Final Office Action for U.S. Appl. No. 10/674,627, mailed on Jun. 5, 2006.
Non-Final Office Action for U.S. Appl. No. 10/376,903, mailed on Jun. 5, 2007, 13 pages.
Advisory Action for U.S. Appl. No. 10/206,580, Mailed Jun. 6, 2006, 3 pages.
Non-Final Office Action for U.S. Appl. No. 12/635,371, mailed on Jun. 8, 2011, 9 pages.
Final Office Action for U.S. Appl. No. 10/214,921, mailed on Jun. 12, 2008, 21 pages.
Non-Final Office Action for U.S. Appl. No. 12/272,618, mailed on Jun. 14, 2011, 12 pages.
Non-Final Office Action for U.S. Appl. No. 09/670,487, Mailed Mar. 15, 2005, 18 pages.
Non-Final Office Action for U.S. Appl. No. 12/496,560, mailed on Jun. 15, 2012, 30 pages.
Non-Final Office Action for U.S. Appl. No. 10/839,919, mailed on Jun. 18, 2008, 15 pages.
Final Office Action for U.S. Appl. No. 11/429,177, mailed on Jun. 20, 2012, 47 pages.
Notice of Intent to Issue Ex Parte Reexamination Certificate for Control No. 90/011,764, mailed on Jun. 21, 2012, 59 pages.
Action Closing Prosecution for Inter Partes Reexamination for Control No. 95/001,804, mailed on Jun. 21, 2012, 75 pages.
Reexamination Request for U.S. Pat. No. 7,581,009, filed Jun. 27, 2011, 109 pages, included: Request for Reexamination Request for U.S. Pat. No. 7,581,009, filed Jun. 27, 2011; 109 pages; Included: Request for Reexamination Transmittal Form; Request for Ex Parte Reexamination; Form PTO/SB/08; Exhibit A—U.S. Pat. No. 7,581,009; Exhibit B—Terminal Disclaimer filed Jan. 29, 2008; and Exhibit C—Delgadillo, "Cisco Distributed Director," White Paper, 1999, at URL: http://www-europe.cisco.warp/public/751/distdir/dd_wp.htm, (19 pages) with Table of Contents for TeleConf99 (16 pages).
Reexamination Documents for U.S. Pat. No. 7,454,500, filed Jun. 27, 2011, 93 pages, Included: Request for Reexamination Transmittal; Request for Ex Parte Reexamination; Form PTO/SB/08; Exhibit A—U.S. Pat. No. 7,454,500; Exhibit B—Delgadillo, "Cisco Distributed," White Paper; Exhibit C—U.S. Pat. No. 7,117,530; and U.S. Appl. No. 60/169,502.
Reexamination Request for U.S. Pat. No. 7,657,629, filed Jun. 27, 2011, 36 pages.
Reexamination Request for U.S. Pat. No. 7,574,508, filed Jun. 27, 2011, 21 pages.
Reexamination Request for U.S. Pat. No. 7,584,301, filed Jun. 27, 2011, 36 pages.
Reexamination Request for U.S. Pat. No. 7,840,678, filed Jun. 27, 2011, 25 pages.
Reexamination Request for U.S. Pat. No. 7,756,965, filed Jun. 27, 2011, 38 pages.
Reexamination Request for U.S. Pat. No. 7,899,899, filed Jun. 27, 2011, 24 pages.
Final Office Action for U.S. Appl. No. 10/305,823, mailed on Jul. 3, 2006, 13 pages.
Ex Parte Interview Summary for Reexamination Control No. 90/011,763, mailed Jul. 5, 2011, 3 pages.
Non-Final Office Action for U.S. Appl. No. 13/023,292, mailed on Jul. 8, 2011, 6 pages.
Advisory Action for U.S. Appl. No. 10/305,823, mailed on Jul. 9, 2008, 4 pages.
Decision on Appeal for U.S. Appl. No. 10/305,823, mailed on Jul. 11, 2011, 10 pages.
Non-Final Office Action for U.S. Appl. No. 10/206,580, Mailed Jul. 12, 2006, 12 pages.
Final Office Action for Office Action for U.S. Appl. No. 12/635,371 mailed on Jul. 13, 2012, 10 pages.
Ex Parte Interview Summary for Reexamination Control No. 90/011,766, mailed Jul. 14, 2011, 3 pages.
Non-Final Office Action for U.S. Appl. No. 10/376,903, mailed on Jul. 17, 2006, 7 pages.
Final Office Action for U.S. Appl. No. 12/506,137 mailed on Jul. 20, 2012, 15 pages.

(56) References Cited

OTHER PUBLICATIONS

Non-Final Office Action for U.S. Appl. No. 09/670,487, Mailed Jul. 22, 2008, 11 pages.
Order Granting Request for Reexamination of U.S. Pat. No. 7,574,508, mailed Jul. 22, 2011, for Reexamination Control No. 90/011,764, 15 pages.
Order Granting Request for Reexamination of U.S. Pat. No. 7,840,678, mailed on Jul. 29, 2011, for Reexamination Control No. 90/011,763, 10 pages.
Non-Final Office Action for U.S. Appl. No. 10/674,627, mailed on Jul. 30, 2007, 9 pages.
Order Granting Request for Reexamination of U.S. Pat. No. 7,657,629, mailed Jul. 30, 2011, for Reexamination Control No. 90/011,766, 10 pages.
Non-Final Office Action for U.S. Appl. No. 12/916,390 mailed on Jul. 30, 2012, 8 pages.
Notice of Intent to Issue a Reexam Certificate for Reexamination Control No. 90/011,770 mailed Jul. 30, 2012, 14 pages.
Final Office Action for U.S. Appl. No. 10/840,496, mailed on Aug. 1, 2008, 13 pages.
Final Office Action for U.S. Appl. No. 10/674,627, mailed on Aug. 3, 2009, 17 pages.
Notice of Allowance for U.S. Appl. No. 11/707,697, mailed on Aug. 5, 2011, 9 pages.
Notice of Allowance for U.S. Appl. No. 10/206,580, Mailed Jul. 6, 2007, 5 pages.
Order Granting Request for Reexamination of U.S. Pat. No. 7,584,301, mailed Aug. 8, 2011, for Reexamination Control No. 90/011,765, 10 pages.
Final Office Action for U.S. Appl. No. 10/214,921, mailed on Aug. 9, 2006, pp. 10 pages.
Final Office Action for U.S. Appl. No. 12/177,021, mailed on Aug. 12, 2010, 6 pages.
Order Granting Request for Reexamination of U.S. Pat. No. 7,454,500, for Control No. 90/011,772, mailed Aug. 12, 2011, 11 pages.
Final Office Action for U.S. Appl. No. 10/214,921, mailed on Aug. 13, 2007, 20 pages.
Notice of Allowance for U.S. Appl. No. 11/707,697, mailed on Aug. 13, 2011, 6 pages.
Non-Final Office Action for U.S. Appl. No. 10/206,580, Mailed Aug. 15, 2005, 14 pages.
Non-Final Office Action for U.S. Appl. No. 10/211,822, Mailed Aug. 19, 2005, 16 pages.
Notice of Allowance for U.S. Appl. No. 10/674,627, mailed on Aug. 19, 2010, 4 pages.
Order Granting Reexamination of U.S. Pat. No. 7,756,965, for Reexamination Control No. 90/011,761, mailed Aug. 19, 2011, 9 pages.
Order Granting Reexamination of U.S. Pat. No. 7,899,899, for Reexamination Control No. 90/011,760, mailed Aug. 19, 2011, 9 pages.
Notice of Intent to Issue Ex Parte Reexamination Certificate for Control No. 90/011,772, mailed on Aug. 27, 2012, 7 pages.
Final Office Action for U.S. Appl. No. 10/377,364, mailed on Aug. 31, 2009, 25 pages.
Non-Final Office Action for U.S. Appl. No. 10/377,364, mailed on Sep. 4, 2007, 13 pages.
Non-Final Office Action for U.S. Appl. No. 10/305,823, mailed on Sep. 10, 2007, 17 pages.
Requirement for Restriction/Election for U.S. Appl. No. 11/707,697, mailed on Sep. 17, 2009, 6 pages.
Non-Final Office Action for U.S. Appl. No. 12/496,560, mailed on Sep. 17, 2010, 27 pages.
Notice of Allowance for U.S. Appl. No. 09/670,487, Mailed Sep. 18, 2008, 7 pages.
Final Office Action for U.S. Appl. No. 09/670,487, Mailed Sep. 21, 2004, 22 pages.
Advisory Action for U.S. Appl. No. 10/214,921, mailed on Sep. 21, 2006, 3 pages.
Order Granting Reexamination of U.S. Pat. No. 7,581,009, for Reexamination Control No. 90/011,770, mailed Sep. 21, 2011, 16 pages.
Non-Final Office Action for U.S. Appl. No. 10/377,364, mailed on Sep. 22, 2006, 18 pages.
Non-Final Office Action for U.S. Appl. No. 12/272,618, mailed on Sep. 29, 2009, 16 pages.
Office Action in Ex Parte Reexamination for Control No. 90/011,766, mailed on Oct. 4, 2011, 7 pages.
Office Action in Ex Parte Reexamination for Control No. 90/011,763, mailed on Oct. 4, 2011, 7 pages.
Non-Final Office Action for U.S. Appl. No. 10/214,921, mailed on Oct. 6, 2008, 33 pages.
Non-Final Office Action for U.S. Appl. No. 12/635,371, mailed on Oct. 7, 2010, 44 pages.
Non-Final Office Action for U.S. Appl. No. 12/506,137, mailed on Oct. 7, 2010, 26 pages.
Notice of Allowance for U.S. Appl. No. 12/506,130, mailed on Oct. 12, 2010, 49 pages.
Non-Final Office Action for Control No. 90/011,772, mailed Oct. 13, 2011, 8 pages.
Office Action in Ex Parte Reexamination for Control No. 90/011,765, mailed on Oct. 13, 2011, 8 pages.
Notice of Allowance for U.S. Appl. No. 10/840,496, mailed on Oct. 15, 2008, 6 pages.
Final Office Action for U.S. Appl. No. 10/376,903, mailed on Oct. 16, 2008.
Advisory Action for U.S. Appl. No. 10/674,627, mailed on Oct. 16, 2009, 3 pages.
Non-Final Office Action for U.S. Appl. No. 10/840,496, mailed on Oct. 18, 2007, 22 pages.
Non-Final Office Action for U.S. Appl. No. 11/429,177, mailed on Oct. 18, 2011, 25 pages.
Notice of Allowance for U.S. Appl. No. 10/376,903, mailed on Oct. 19, 2009, 4 pages.
Final Office Action for U.S. Appl. No. 09/670,487, Mailed Oct. 30, 2007, 14 pages.
Final Office Action for U.S. Appl. No. 11/741,480, Mailed Oct. 31, 2008, 15 pages.
Final Office Action for U.S. Appl. No. 09/670,487, Mailed Nov. 3, 2005, 18 pages.
Final Office Action for U.S. Appl. No. 10/674,627, mailed on Nov. 3, 2006, 16 pages.
Non-Final Office Action for U.S. Appl. No. 12/353,701, mailed on Nov. 4, 2009, 22 pages.
Request for Inter Partes Reexamination for U.S. Pat. No. 7,581,009 B1, filed Nov. 4, 2011, 197 pages.
Request for Inter Partes Reexamination for U.S. Pat. No.7,454,500 B1, filed Nov. 4, 2011, 157 pages.
Request for Inter Partes Reexamination for U.S. Pat. No. 7,574,508 B1, filed Nov. 4, 2011, 70 pages.
Notice of Inter Partes Reexamination Request Filing Date for Control No. 95/001,804, mailed Nov. 8, 2011, 1 page.
Notice of Assignment of Inter Partes Reexamination Request for Control No. 95/001,804, mailed Nov. 8, 2011, 1 page.
Action Closing Prosecution in Inter Partes Reexamination for Control No. 95/001,812, mailed on Jun. 2, 2012, 49 pages.
Notice of Inter Partes Reexamination Request Filing Date for Control No. 95/001,807, mailed Nov. 10, 2011, 1 page.
Notice of Assignment of Inter Partes Reexamination Request for Control No. 95/001,807, mailed Nov. 10, 2011, 1 page.
Office Action in Ex Parte Reexamination for Control No. 90/011,764, mailed on Nov. 14, 2011, 17 pages.
Non-Final Office Action for U.S. Appl. No. 10/214,921, mailed on Nov. 15, 2007, 23 pages.
Non-Final Office Action for U.S. Appl. No. 09/670,487, Mailed Nov. 17, 2006, 11 pages.
Decision on Petition for Extension of Time in Reexamination for Control No. 90/011,772, mailed Nov. 17, 2011, 3 pages.
Request for Inter Partes Reexamination for U.S. Pat. No. 7,657,629 B1, filed Nov. 17, 2011, 238 pages.
Decision on Petition for Extension of Time in Reexamination for Control No. 90/011,763, mailed Nov. 17, 2011, 3 pages.

(56) References Cited

OTHER PUBLICATIONS

Request for Inter Partes Reexamination for U.S. Pat. No. 7,840,678, mailed on Nov. 17, 2011, 164 pages.
Notice of Assignment of Inter Partes Reexamination Request and Notice of Reexamination Request Filing Date for Control No. 95/001,806, mailed on Nov. 18, 2011, 1 page.
Office Action in Ex Parte Reexamination for Control No. 90/011,764, mailed on Nov. 18, 2011, 19 pages.
Office Action in Ex Parte Reexamination for Control No. 90/011,761, mailed on Nov. 18, 2011, 13 pages.
Request for Inter Partes Reexamination for U.S. Pat. No. 7,756,965 B1, filed Nov. 18, 2011, 189 pages.
Office Action in Ex Parte Reexamination for Control No. 90/011,760, mailed on Nov. 18, 2011, 8 pages.
Request for Inter Partes Reexamination for U.S. Pat. No. 7,899,899 B1, filed Nov. 18, 2011, 153 pages.
Non-Final Office Action for U.S. Appl. No. 11/707,697, mailed on Nov. 22, 2010, 24 pages.
Advisory Action for U.S. Appl. No. 10/377,364, mailed on Nov. 23, 2009, 3 pages.
Non-Final Office Action for U.S. Appl. No. 12/506,137, mailed on Nov. 23, 2011, 63 pages.
Notice of Inter Partes Reexamination Request Filing Date for Control No. 95/001,822, mailed Nov. 23, 2011, 1 page.
Notice of Assignment of Inter Partes Reexamination Request for Control No. 95/001,822, mailed Nov. 23, 2011, 1 page.
Non-Final Office Action for U.S. Appl. No. 10/377,364, mailed on Nov. 24, 2008, 24 pages.
Final Office Action for U.S. Appl. No. 12/272,618, mailed on Nov. 26, 2010, 22 pages.
Non-Final Office Action for U.S. Appl. No. 11/741,480, Mailed Nov. 27, 2007, 12 pages.
Ex Parte Reexamination Interview Summary for Control No. 90/011,772, mailed Nov. 29, 2011, 3 pages.
Ex Parte Reexamination Interview Summary for Control No. 90/011,766, mailed on Nov. 29, 2011, 57 pages.
Ex Parte Reexamination Interview Summary for Control No. 90/011,765, mailed Nov. 29, 2011, 57 pages.
Ex Parte Reexamination Interview Summary for Control No. 90/011,763, mailed on Nov. 29, 2011, 58 pages.
Notice of Inter Partes Reexamination Request Filing Date for Control No. 95/001,826, mailed Nov. 29, 2011, 1 page.
Notice of Assignment of Inter Partes Reexamination Request for Control No. 95/001,826, mailed Nov. 29, 2011, 1 page.
Notice of Inter Partes Reexamination Request Filing Date for Control No. 95/001,827, mailed Dec. 1, 2011, 1 page.
Notice of Assignment of Inter Partes Reexamination Request for Control No. 95/001,827, mailed on Dec. 1, 2011, 1 page.
Decision on Petition for Extension of Time in Reexamination for Control No. 90/011,766, mailed Dec. 2, 2011, 3 pages.
Notice of Inter Partes Reexamination Request Filing Date for Control No. 95/001,824, mailed Dec. 5, 2011, 1 page.
Notice of Assignment of Inter Partes Reexamination Request for Control No. 95/001,824, mailed Dec. 5, 2011, 1 page.
Non-Final Office Action for U.S. Appl. No. 10/214,921, mailed on Dec. 7, 2006, 11 pages.
Order Granting Request for Inter Partes Reexamination of U.S. Pat. No. 7,574,508 and Office Action in Inter Partes Reexamination for Control No. 95/001,804, mailed Dec. 8, 2011, 22 pages.
Final Office Action for U.S. Appl. No. 10/839,919, mailed on Dec. 9, 2008, 22 pages.
Notice of Allowance for U.S. Appl. No. 12/177,021, mailed on Dec. 10, 2010, 20 pages.
Office Action in Inter Partes Reexamination for Control No. 95/001,806, mailed Dec. 16, 2011, 43 pages.
Notice of Allowance for U.S. Appl. No. 12/787,779, mailed on Dec. 20, 2010, 45 pages.
Non-Final Office Action for U.S. Appl. No. 10/674,627, mailed on Dec. 23, 2008, 18 pages.

Non-Final Office Action for U.S. Appl. No. 09/670,487, Mailed Dec. 31, 2003, 24 pages.
Third Party Requester's Comments under 35 U.S.C. § 314(B)(2) and 37 C.F.R. § 1.947, for Reexamination Control No. 95/001,806 filed on Mar. 19, 2012, 34 pages.
Order Granting Request for Inter Partes Reexamination of U.S. Pat. No. 7,657,629 and Office Action for Reexamination Control No. 95/001,824 mailed on Jan. 12, 2012, 32 pages.
Notice of Allowance for U.S. Appl. No. 11/707,697 mailed on Aug. 12, 2011, 2 pages.
Office Communication for U.S. Appl. No. 12/635,371 mailed on Mar. 24, 2011, 28 pages.
Ex Parte Reexamination Interview Summary for Reexamination Control No. 90/011,764 mailed on Jan. 6, 2012, 52 pages.
Decision on Request for Rehearing for U.S. Appl. No. 10/305,823 mailed on Nov. 1, 2011, 5 pages.
Order Granting Request for Inter Partes Reexamination of U.S. Pat. No. 7,840,678 and Office Actin for Reexamination Control No. 95/001,822 mailed on Jan. 12, 2012, 23 pages.
Non-Final Office Action for U.S. Appl. No. 13/101,398 mailed on Nov. 10, 2011, 59 pages.
Order Granting Request for Inter Partes Reexamination of U.S. Pat. No. 7,756,965 and Office Action mailed on Feb. 13, 2012 for Reexamination Control No. 95/001,827, 17 pages.
Notice of Reexamination Request Filing Date and Notice of Assignment of Reexamination Request mailed on Jul. 8, 2011 for Reexamination Control No. 90/011,760, 2 pages.
Office Communication for U.S. Appl. No. 13/023,292 mailed on Feb. 23, 2012, 11 pages.
Decision on Petition for Extension of Time in Reexamination (Granted) mailed on Jan. 5, 2012 for Reexamination Control No. 90/011,760, 3 pages.
Notice of Reexamination Request Filing Date and Notice of Assignment of Reexamination Request, mailed Jun. 30, 2011, Reexamination Control No. 90/011,761, 2 pages.
Notice of Reexamination Request Filing Date and Notice of Assignment of Reexamination Request, mailed Jul. 1, 2011, Reexamination Control No. 90/011,772, 2 pages.
Ex Parte Reexamination Interview Summary for Reexamination Control No. 90/011,772, mailed Jul. 21, 2011, 3 pages.
Third Party Requester's Opposition to Petition to Vacate, for Reexamination Control No. 95/001,806, filed Mar. 1, 2012, 11 pages.
Third Party Requester's Opposition to Petition to Suspend Reexamination for Reexamination Control No. 95/001,806, filed Mar. 2, 2012, 12 pages.
Third Party Requester's Opposition to Patent Owner's Petition to "Supplement," for Reexamination Control No. 95/001,806, filed Apr. 19, 2012, 19 pages.
Ex Parte Reexamination Interview Summary, for Reexamination Control No. 90/011,770, mailed Jul. 18, 2011, 3 pages.
Decision on Petition for Extension of Time in Reexamination (Granted), mailed Mar. 28, 2012, Reexamination Control No. 90/011,770, 3 pages.
Decision on Petition for Extension of Time in Reexamination (Granted), mailed Mar. 30, 2012, Reexamination Control No. 95/001,807, 3 pages.
Third Party Requester's Opposition to Petition to Vacate, for Reexamination Control No. 95/001,807, filed Apr. 16, 2012, 15 pages.
Office Communication for U.S. Appl. No. 12/496,560, mailed on Jun. 14, 2011, 5 pages.
Notice of Reexamination Request Filing Date and Notice of Assignment of Reexamination Request, mailed Jul. 7, 2011, Reexamination Control No. 90/011,766, 2 pages.
Notice of Inter Partes Reexamination Request Filing Date and Notice of Assignment of Inter Partes Reexamination Request, mailed Dec. 5, 2011, Reexamination Control No. 95/001,824, 2 pages.
Third Party Requester's Comments under 35 U.S.C. § 314(B)(2) and 37 C.F.R. § 1.947, for Reexamination Control No. 95/001,824, filed Apr. 11, 2012, 21 pages.

(56) References Cited

OTHER PUBLICATIONS

Notice of Reexamination Request Filing Date and Notice of Assignment of Reexamination Request, mailed Jun. 29, 2011, Reexamination Control No. 90/011,764, 2 pages.
Ex Parte Interview Summary for Reexamination Control No. 90/011,764, Jul. 21, 2011, 3 pages.
Decision on Petition for Extension of Time in Reexamination (Granted), mailed Jan. 3, 2012, Reexamination Control No. 90/011,764, 3 pages.
Notice of Reexamination Request Filing Date and Notice of Assignment of Reexamination Request, mailed Jul. 6, 2011, Reexamination Control No. 90/011,765, 2 pages.
Ex Parte Interview Summary for Reexamination Control No. 90/011,765, Jul. 6, 2011, 3 pages.
Decision on Petition for Extension of Time in Reexamination (Granted), mailed Dec. 9, 2011, Reexamination Control No. 90/011,765, 3 pages.
Third Party Requester's Comments under 35 U.S.C. § 314(B)(2) and 37 C.F.R. § 1.947, for Reexamination Control No. 95/001,812, filed Mar. 29, 2012, 30 pages.
Notice of Reexamination Request Filing Date and Notice of Assignment of Reexamination Request, mailed Jul. 1, 2011, Reexamination Control No. 90/011,763, 2 pages.
Ex Parte Interview Summary for Reexamination Control No. 90/011,761, mailed Jul. 6, 2011, 3 pages.
Decision on Petition for Extension of Time in Reexamination (Granted), mailed Jan. 3, 2012, Reexamination Control No. 90/011,761, 3 pages.
Ex Parte Interview Summary for Reexamination Control No. 90/011,760, mailed Jul. 18, 2011, 3 pages.
Office Communication for U.S. Appl. No. 13/023,292, mailed Jul. 2, 2012, 7 pages.
Office Communication for U.S. Appl. No. 13/023,292, mailed Aug. 24, 2012, 8 pages.
Non-Final Office Action for U.S. Appl. No. 13/595,952, mailed Nov. 13, 2012, 5 pages.
Notice of Allowance for U.S. Appl. No. 10/924,552, Mailed May 30, 2008, 14 pages.
Non-Final Office Action for U.S. Appl. No. 13/008,321, mailed Nov. 20, 2012, 6 pages.
Ex Parte Reexamination Advisory Action for Reexamination Control No. 90/011,771 mailed on Nov. 15, 2012, 12 pages.
Right of Appeal Notice for Reexamination Control No. 90/001,804 mailed on Nov. 15, 2012, 8 pages.
Action Closing Prosecution, for Reexamination Control No. 95/001,806, mailed Sep. 25, 2012, 57 pages.
Request for Inter Partes Reexamination for U.S. Pat. No. 7,584,301, filed Nov. 8, 2011, 194 pages.
Notice of Inter Partes Reexamination Request Filing Date and Notice of Assignment of Inter Partes Reexamination Request, mailed Nov. 21, 2011, Reexamination Control No. 95/001,812, 2 pages.
Office Action in Inter Partes Reexamination for Control No. 95/001,812, mailed Dec. 28, 2011, 25 pages.
Examiner's Answer to Appeal Brief for Reexamination Control No. 95/001,812 mailed on May 7, 2013, 3 pages.
Non-Final Office Action for U.S. Appl. No. 12/272,618 mailed on Jul. 29, 2013, 13 pages.
Decision on Petition to Strike Third Party Requester's Respondent Brief of Apr. 22, 2013 (Dismissed) for Reexamination Control No. 95/001,812 mailed Jun. 4, 2013, 3 pages.
Notice of Withdrawal of Third Party Requester A10 Networks, Inc. for Reexamination Control No. 95/001,812 filed Jun. 13, 2013, 2 pages.
Order Granting Request for Inter Partes Reexamination of U.S. Pat. No. 7,581,009 and Office Action for Reexamination Control No. 95/001,807, mailed Jan. 31, 2012, 22 pages.
Order Granting Request for Inter Partes Reexamination of U.S. Pat. No. 7,584,301 and Office Action for Reexamination Control No. 95/001,812, mailed Dec. 28, 2011, 25 pages.
Order Granting Request for Inter Partes Reexamination of U.S. Pat. No. 7,899,899 and Office Action for Reexamination Control No. 95/001,826, mailed Feb. 7, 2012, 19 pages.
Notice of Reexamination Request Filing Date and Notice of Assignment of Reexamination Request mailed on Jul. 8, 2011 for Reexamination Control No. 90/011,770, 2 pages.
Third Party Requester's Comments under 35 U.S.C. § 314(B)(2) and 37 C.F.R. § 1.947, for Reexamination Control No. 95/001,822, filed Apr. 11, 2012, 33 pages.
Decision on Petition for Extension of Time in Reexamination (Granted), mailed Mar. 30, 2012, Reexamination Control No. 95/001,827, 3 pages.
Decision on Petition for Extension of Time in Reexamination (Granted), mailed Apr. 4, 2012, Reexamination Control No. 95/001,826, 3 pages.
Third Party Requester's Comments under 35 U.S.C. § 314(B)(2) and 37 C.F.R. § 1.947, with exhibits A-E, for Reexamination Control No. 95/001,804 filed on Mar. 9, 2012, 76 pages.
Action Closing Prosecution, for Reexamination Control No. 90/011,775, mailed Jun. 27, 2012, 18 pages.
Office Action in Ex Parte Reexamination for Control No. 90/011,771, mailed Jul. 19, 2012, 17 pages.
Action Closing Prosecution, for Reexamination Control No. 90/011,775, mailed Sep. 18, 2012, 4 pages.
Office Action in Ex Parte Reexamination for Reexamination Control No. 90/011,769, mailed Jul. 17, 2012, 14 pages.
Advisory Action for Ex Parte Reexamination for Control No. 90/011,769 mailed on Oct. 1, 2012, 14 pages.
Advisory Action for Ex Parte Reexamination for Control No. 90/011,763 mailed on Jul. 13, 2012, 13 pages.
Advisory Action for Ex Parte Reexamination for Control No. 90/011,766 mailed on Oct. 25, 2012, 30 pages.
Final Office Action for U.S. Appl. No. 12/916,390 mailed on Jan. 15, 2013, 11 pages.
Action Closing Prosecution for Reexamination Control No. 95/001,807 mailed Jan. 4, 2013, 35 pages.
Third Party Requester's Comments under 35 U.S.C. § 314(B)(2) and 37 C.F.R. § 1.947,for Reexamination Control No. 95/001,826 filed on Jun. 6, 2012, 43 pages.
Third Party Requester's Comments under 35 U.S.C. § 314(B)(2) and 37 C.F.R. § 1.947, with exhibits 1-7, for Reexamination Control No. 95/001,807 filed on May 30, 2012, 142 pages.
Final Office Action for U.S. Appl. No. 13/101,398, mailed Jun. 11, 2012, 12 pages.
Third Party Requester's Comments under 35 U.S.C. § 314(B)(2) and 37 C.F.R. § 1.947, for Reexamination Control No. 95/001,827 filed on Jun. 13, 2012, 37 pages.
Ex Parte Reexamination Certificate for Control No. 90/011,770 issued on Sep. 11, 2012, 2 pages.
Third Party Requester's Opposition to Petition for Reconsideration for Reexamination Control No. 95/001,806 filed on Oct. 19, 2012, 52 pages.
Decision on Petition for Extension of Time in Reexamination (Granted) for Control No. 90/001,806, mailed Oct. 24, 2012, 3 pages.
Third Party Requester's Opposition to Petition to Expunge Third Party Comments and Vacate Reexamination for Reexamination Control No. 95/001,806 filed Dec. 7, 2012, 11 pages.
Third Party Requester's Comments Under 35 U.S.C. §314(B)(2) and 37 C.F.R. §1.947 for Reexamination Control No. 95/001,806 filed on Dec. 26, 2012, 32 pages.
Decision on Petition for Extension of Time in Reexamination (Dismissed) for Control No. 90/001,807, mailed Aug. 30, 2012, 5 pages.
Decision on Petition for Extension of Time in Reexamination (Dismissed) for Control No. 90/001,807, mailed Sep. 10, 2012, 11 pages.
Third Party Requester's Opposition to Petition to for Reconsideration for Reexamination Control No. 95/001,807 filed Oct. 19, 2012, 11 pages.
Third Party Requester's Comments Under 35 U.S.C. §314(B)(2) and 37 C.F.R. §1.947 for Reexamination Control No. 95/001,807 filed on Mar. 7, 2013, 34 pages.

(56) References Cited

OTHER PUBLICATIONS

Ex Parte Reexamination Certificate for Control No. 90/011,766 issued on Mar. 22, 2013, 2 pages.
Notice of Intent to Issue Ex Parte Reexamination Certificate for Control No. 90/011,766, mailed Feb. 27, 2013, 9 pages.
Right of Appeal Notice for Reexamination Control No. 90/001,824 mailed on Oct. 15, 2012, 41 pages.
Third Party Requester's Opposition to Petition to Have Inter Partes Reexamination Vacated for Control No. 95/001,824 filed Jan. 28, 2013, 5 pages.
Third Party Requester's Comments Under 35 U.S.C. §314(B)(2) and 37 C.F.R. §1.947 for Reexamination Control No. 95/001,824 filed on Sep. 17, 2012, 25 pages.
Decision on Petition To Have Inter Partes Reexamination Vacated, Or Alternatively to Be Determined (Dismissed) for Control No. 90/001,824, mailed Mar. 22, 2013, 6 pages.
Ex Parte Reexamination Certificate for Control No. 90/011,764 issued on Aug. 14, 2012, 2 pages.
Examiner's Answer to Appeal Brief for Reexamination Control No. 95/001,812 mailed on Jun. 20, 2013, 26 pages.
Third Party Requester's Comments Under 35 U.S.C. §314(B)(2) and 37 C.F.R. §1.947 for Reexamination Control No. 95/001,822 filed on Jul. 5, 2012, 24 pages.
Third Party Requester's Comments Under 35 U.S.C. §314(B)(2) and 37 C.F.R. §1.947 for Reexamination Control No. 95/001,827 filed on May 8, 2013, 29 pages.
Examiner's Answer to Appeal Brief for Reexamination Control No. 90/011,760, mailed on Apr. 29, 2013, 19 pages.
Ex Parte Reexamination Certificate for Control No. 90/011,772 issued on Nov. 6, 2012, 2 pages.
Decision of Petition (Dismissed) for Reexamination Control No. 95/001,806 mailed Sep. 10, 2012, 11 pages.
Office Communication for U.S. Appl. No. 12/635,371 mailed Jul. 25, 2012, 42 pages.
Third Party Requester's Comments Under 35 U.S.C. §314(B)(2) and 37 C.F.R. §1.947 for Reexamination Control No. 95/001,812 filed on Aug. 1, 2012, 27 pages.
Advisory Action Before the Filing of an Appeal Brief for Reexamination Control No. 90/011,763 mailed Sep. 6, 2012, 9 pages.
Examiner's Answer to Appeal Brief for Reexamination Control No. 90/011,763 mailed Nov. 26, 2012, 20 pages.
Right of Appeal Notice for Reexamination Control No. 95/001,822 mailed on Aug. 9, 2012, 26 pages.
Examiner's Answer to Appeal Brief for Reexamination Control No. 90/011,761 mailed on Apr. 30, 2013, 20 pages.
Decision Dismissing Petition to Terminate Inter Partes Reexamination Proceeding for Reexamination Control No. 95/001,812 mailed Aug. 30, 2013, 9 pages.
Notice of Allowance for U.S. Appl. No. 13/595,952 mailed Apr. 11, 2013, 6 pages.
Notice of Withdrawal of Third Party Requester A10 Networks, Inc. for Reexamination Control No. 95/001,824 filed Jun. 13, 2013, 2 pages.
Notice of Withdrawal of Third Party Requester A10 Networks, Inc. for Reexamination Control No. 95/001,805 filed Jun. 13, 2013, 2 pages.
Notice of Withdrawal of Third Party Requester A10 Networks, Inc. for Reexamination Control No. 95/001,808 filed Jun. 13, 2013, 2 pages.
Notice of Withdrawal of Third Party Requester A10 Networks, Inc. for Reexamination Control No. 95/001,811 filed Jun. 13, 2013, 2 pages.
Notice of Withdrawal of Third Party Requester A10 Networks, Inc. for Reexamination Control No. 95/001,827 filed Jun. 13, 2013, 2 pages.
Notice of Withdrawal of Third Party Requester A10 Networks, Inc. for Reexamination Control No. 95/001,826 filed Jun. 13, 2013, 2 pages.
Notice of Withdrawal of Third Party Requester A10 Networks, Inc. for Reexamination Control No. 95/001,822 filed Jun. 13, 2013, 2 pages.
Notice of Withdrawal of Third Party Requester A10 Networks, Inc. for Reexamination Control No. 95/001,815 filed Jun. 13, 2013, 2 pages.
Notice of Withdrawal of Third Party Requester A10 Networks, Inc. for Reexamination Control No. 95/001,807 filed Jun. 13, 2013, 2 pages.
Notice of Withdrawal of Third Party Requester A10 Networks, Inc. for Reexamination Control No. 95/001,806 filed Jun. 13, 2013, 2 pages.
Notice of Withdrawal of Third Party Requester A10 Networks, Inc. for Reexamination Control No. 95/001,804 filed Jun. 13, 2013, 2 pages.
Notice of Withdrawal of Third Party Requester A10 Networks, Inc. for Reexamination Control No. 95/001,803 filed Jun. 13, 2013, 2 pages.
Notice of Intent to Issue Inter Parte Reexamination Certificate for Control No. 90/011,763, mailed Dec. 24, 2013, 8 pages.
Decision on Appeal for Reexamination Control No. 90/011,765 filed Dec. 23, 2013, 45 pages.
Decision on Appeal for Reexamination Control No. 90/011,761 filed Dec. 19, 2013, 48 pages.
Final Office Action for U.S. Appl. No. 12/506,137 mailed on Dec. 17, 2013, 23 pages.
Appelant's Appeal Brief Pursuant to 37 C.F.R. § 41.67 for Reexamination Control No. 95/001,827 filed Dec. 17, 2013, 160 pages.
Reexamination Certificate for Control No. 90/001,824 issued on Dec. 10, 2013, 2 pages.
Notice of Intent to Issue Inter Parte Reexamination Certificate for Control No. 90/001,824, mailed Nov. 25, 2013, 9 pages.
Patent Owner's Appeal Brief Pursuant to 37 C.F.R. § 41.37 for Reexamination Control No. 90/011,765 filed Nov. 16, 2012, 26 pages.
Notice of Appeal for Reexamination Control No. 95/001,806 filed Nov. 4, 2013, 1 page.
Non-Final Office Action for U.S. Appl. No. 10/305,823 mailed Nov. 1, 2013, 21 pages.
Appellant's Appeal Brief Pursuant to 37 C.F.R. § 41.67 for Reexamination Control No. 95/001,807 filed Oct. 28, 2013, 226 pages.
Reexamination Certificate for Control No. 90/001,804 issued on Oct. 24, 2013, 2 pages.
Notice of Appeal for Reexamination Control No. 95/001,827 filed Oct. 17, 2013, 1 page.
Right of Appeal Notice for Reexamination Control No. 95/001,806 mailed Oct. 9, 2013, 92 pages.
Final Office Action for U.S. Appl. No. 13/101,398 mailed Sep. 25, 2013, 15 pages.
Right of Appeal Notice for Reexamination Control No. 95/001,827 mailed Sep. 18, 2013, 28 pages.
Non-Final Office Action for U.S. Appl. No. 12/635,371 mailed Sep. 11, 2013, 10 pages.
Patent Owner's Rebuttal Brief Pursuant to 37 C.F.R. § 41.71 for Reexamination Control No. 95/001,822 filed Sep. 11, 2013, 20 pages.
Decision Dismissing Petition to Terminate Inter Partes Reexamination Proceding for Reexamination Control No. 95/001,807 mailed Aug. 30, 2013, 9 pages.
Decision Dismissing Petition to Terminate Inter Partes Reexmanation Proceeding for Reexamination Control No. 95/001,824 mailed Aug. 30, 2013, 9 pages.
Notice of Appeal for Reexamination Control No. 95/001,807 filed Aug. 26, 2013, 2 pages.
Decision on Appeal (Affirmance) for Reexamination Control No. 90/011,763 mailed Jul. 24, 2013, 14 pages.
Right of Appeal Notice for Reexamination Control No. 95/001,807 mailed Jul. 24, 2013, 23 pages.
Decision on Petition Under 37 C.F.R. § 1.182 to Declare the Third Party Requester's Submission of Feb. 14, 2013 Improper and Strike it From the Record (Denied) for Reexamination Control No. 95/001,824 mailed Jul. 24, 2013, 6 pages.

(56) References Cited

OTHER PUBLICATIONS

Non-Final Office Action for U.S. Appl. No. 10/674,627 mailed on Jul. 18, 2013, 9 pages.
Examiner's Answer to Appeal Brief for Reexamination Control No. 95/001,822 filed Jul. 17, 2013, 25 pages.
Decision Dismissing Petition to Expunge Comments and Action Closing Prosecution for Reexamination Control No. 95/001,806 mailed Jul. 10, 2013, 8 pages.
Patent Owner's Petition Under 37 C.F.R. § 1.182 to Terminate the Reexamination Proceeding for Reexamination Control No. 95/001,827 filed Jul. 10, 2013, 8 pages.
Patent Owner's Petition Under 37 C.F.R. § 1.182 to Terminate the Reexamination Proceeding for Reexamination Control No. 95/001,826 filed Jul. 10, 2013, 8 pages.
Non-Final Office Action for U.S. Appl. No. 12/759,438 mailed Jul. 3, 2013, 18 pages.
Decision of Petition for Reconsideration of Sep. 10, 2012 Decision (Denied) for Reexamination Control No. 95/001,806 mailed Jul. 1, 2013, 23 pages.
Patent Owner's Reply Brief Pursuant to 37 C.F.R. § 41.41 for Reexamination Control No. 90/011,760 filed Jul. 1, 2013, 14 pages.
Patent Owner's Reply Brief Pursuant to 37 C.F.R. § 41.41 for Reexamination Control No. 90/011,761 filed Jul. 1, 2013, 15 pages.
Notice of Allowance for U.S. Appl. No. 12/916,390 mailed on Jun. 24, 2013, 6 pages.
Non-Final Office Action for U.S. Appl. No. 11/429,177 mailed Jun. 21, 2013, 14 pages.
Right of Appeal Notice for Reexamination Control No. 95/001,812 mailed on Dec. 19, 2012, 57 page.
Non-Final Office Action for U.S. Appl. No. 12/506,137 mailed on Jun. 7, 2013, 19 pages.
Non-Final Office Action for U.S. Appl. No. 13/101,398 mailed Jun. 6, 2013, 15 pages.
Action Closing Prosecution (Non-Final) for Reexamination Control No. 95/001,826 mailed May 28, 2013, 35 pages.
Examiner's Answer to Appeal Brief for Reexamination Control No. 90/011,761 filed Apr. 30, 2013, 20 pages.
Examiner's Answer to Appeal Brief for Reexamination Control No. 90/011,760 mailed Apr. 29, 2013, 19 pages.
Decision on Petition to Have Inter Partes Reexamination Vacated, Or Alternatively to be Determined a Director Ordered Reexamination Under 37 C.F.R. § 1.181 (Dismissed) for Reexamination Control No. 95/001,824 mailed Mar. 22, 2013, 6 pages.
Patent Owner's Reply Brief Pursuant to 37 C.F.R. § 41.41 for Reexamination Control No. 90/011,765 filed Feb. 21, 2013, 16 pages.
Third Party A10 Networks, Inc.'s Appeal Brief Pursuant to 37 C.F.R. § 41.67 for Reexamination Control No. 95/001,804 filed Feb. 19, 2013, 18 pages.
Third Party A10 Networks, Inc. Respondent Brief for Reexamination Control No. 95/001,824 filed Feb. 14, 2013, 27 pages.
Non-Final Office Action for U.S. Appl. No. 12/759,438 mailed Jan. 25, 2013, 18 pages.
Reexamination Certificate for Control No. 90/011,763 issued on Jan. 15, 2014, 2 pages.
Right of Appeal Notice for Reexamination Control No. 95/001,826 mailed Jan. 9, 2014, 28 pages.
Appellant's Appeal Brief Pursuant to 37 C.F.R. § 41.67 for Reexamination Control No. 95/001,806 filed Jan. 6, 2014, 45 pages.
Decision on Petition to Entry of the Azarani Declaration and the 2nd Hsu Declaration (Dismissed) for Reexamination Control No. 95/001, 806 mailed Feb. 20, 2014, 4 pages.
Examiner's Answer to Appeal Brief for Reexamination Control No. 95/001,807 mailed on Feb. 26, 2014, 20 pages.
Non-Final Office Action for U.S. Appl. No. 13/101,398 mailed on Feb. 24, 2014, 13 pages.
Examiner's Answer to Appeal Brief for Reexamination Control No. 95/001,827 mailed on Feb. 19, 2014, 3 pages.
Final Office Action for U.S. Appl. No. 12/272,618 mailed on May 5, 2014, 13 pages.
Appellant's Rebuttal Brief Pursuant to 37 C.F.R. § 41.71 for Reexamination Control No. 95/001,807 filed on Mar. 26, 2014, 20 pages.
Final Office Action for U.S. Appl. No. 10/305,823 mailed on Apr. 24, 2014, 19 pages.
Decision on Appeal for Reexamination Control No. 95/001,822 mailed on Apr. 30, 2014, 32 pages.
Final Office Action for U.S. Appl. No. 12/635,371 mailed on May 21, 2014, 12 pages.
Appellant's Appeal Brief Pursuant to 37 C.F.R. § 41.67 for Reexamination Control No. 95/001,806 filed on May 22, 2014, 40 pages.
Notice of Allowance for U.S. Appl. No. 13/101,398 mailed on Jun. 17, 2014, 9 pages.
Non-Final Office Action for U.S. Appl. No. 12/506,137 mailed on Aug. 13, 2014, 19 pages.
Examiner's Answer to Appeal Brief for Reexamination Control No. 95/001,806 mailed on Aug. 25, 2014, 25 pages.
Decision *Sua Sponte* Terminating Ex Parte Reexamination Proceeding for Reexamination Control No. 95/011,760 mailed on Sep. 19, 2014, 4 pages.
Appellant's Rebuttal Brief Pursuant to 37 C.F.R. § 41.71 for Reexamination Control No. 95/001,806 filed on Sep. 25, 2014, 15 pages.
Notice of Allowance for U.S. Appl. No. 11/429,177 mailed on Oct. 1, 2014, 9 pages.
Final Office Action for U.S. Appl. No. 10/674,627 mailed on Mar. 26, 2014, 8 pages.
Non-Final Office Action for U.S. Appl. No. 10/674,627 mailed on Jul. 31, 2014, 7 pages.
Non-Final Office Action for U.S. Appl. No. 12/272,618 mailed on Jan. 12, 2015, 5 pages.
Non-Final Office Action for U.S. Appl. No. 12/635,371 mailed on Nov. 13, 2014, 6 pages.
Patent Board Decision—Examiner Affirmed for Reexamination Control No. 95/001,827 mailed on Dec. 16, 2014, 74 pages.
Final Office Action for U.S. Appl. No. 10/674,627 mailed on Jan. 15, 2015, 9 pages.
Non-Final Office Action for U.S. Appl. No. 10/305,823 mailed on Feb. 18, 2015, 7 pages.
Notice of Allowance for U.S. Appl. No. 12/635,371 mailed on Mar. 2, 2015, 5 pages.
Final Office Action for U.S. Appl. No. 10/305,823 mailed on May 13, 2015, 7 pages.
Final Office Action for U.S. Appl. No. 13/584,534 mailed on Jun. 25, 2015, 23 pages.
Reply Brief Noted—Patent Board for Reexamination Control No. 95/001,807 dated Jul. 15, 2014, 3 pages.
Appeal Docketing Notice for Reexamination Control No. 95/001,807 dated Jul. 31, 2014, 5 pages.
Notification of Appeal Hearing for Reexamination Control No. 95/001,807 dated Sep. 30, 2014, 4 pages.
Confirmation of Hearing by Appellant for Reexamination Control No. 95/001,807 dated Oct. 21, 2014, 18 pages.
Patent Board Decision—Examiner Affirmed in Part for Reexamination Control No. 95/001,807 dated Mar. 2, 2015, 15 pages.
Miscellaneous Action with SSP for Reexamination Control No. 95/001,807 dated Mar. 11, 2015, 22 pages.
Appeal Docketing Notice for Reexamination Control No. 95/001,806 dated on Apr. 13, 2015, 8 pages.
Reexam Litigation Search Conducted for Reexamination Control No. 95/001,807 dated Jul. 14, 2015, 128 pages.
Notification of Appeal Hearing for Reexamination Control No. 95/001,806 dated on Aug. 7, 2015, 4 pages.
Notice of Allowance, mailed Jun. 26, 2015, for U.S. Appl. No. 10/305,823, filed Nov. 27, 2002, 8 pages.
Notice of Allowance, mailed Aug. 26, 2015, for U.S. Appl. No. 12/272,618, filed Nov. 17, 2008, 11 pages.
Civil Action 10-332—Complaint for Patent Infringement, filed on Apr. 23, 2010, with Exhibits A through G, 131 pages.
Civil Action 10-332—*Brocade Communication Systems, Inc.* v. *A10.Networks, Inc.*—Civil Cover Sheet, filed on Apr. 23, 2010, 1 page.

(56) References Cited

OTHER PUBLICATIONS

Civil Action 10-332—Second Amended and Supplemental Complaint for Patent Infringement, filed on Jul. 16, 2010, with Exhibits A through I, 158 pages.
Civil Action 10-332—Report on the Filing or Determination of an Action Regarding a Patent or Trademark, filed on Aug. 5, 2010, 2 pages.
Civil Action 10-332—Notice of Voluntary Dismissal Without Prejudice, filed on Aug. 5, 2010, 2 pages.
Document 1. Civil Action—CV10-03428—Complaint for Patent Infringement, Trade Secret Misappropriation, Breach of Contract, Interference with Contract, and Unfair Competition Under Cal. Bus. & Prof. Code §§ 17200 et seq., filed on Aug. 4, 2010, with Exhibits A through M, 196 pages.
Document 16. Civil Action—CV10-03428—Order Reassigning Case. Case reassigned to Judge Hon. Lucy H. Koh for all further proceedings. Judge Magistrate Judge Elizabeth D. Laporte no longer assigned to the case, filed Aug. 16, 2010, 1 page.
Document 24. Civil Action—CV10-03428—Motion to Dismiss Complaint filed by A10 Networks, Inc., Lee Chen, Rajkumar Jalan, Ron Szeto, filed Oct. 11, 2010, 30 pages.
Document 1. Civil Action—Case No. CV10-03443—Complaint for Declaratory Judgment, filed on Aug. 6, 2010, with Exhibits A through I, 153 pages.
Document 10. Civil Action—Case No. CV10-03443—Notice of Voluntary Dismissal Without Prejudice, filed on Aug. 16, 2010, 2 pages.
Document 37. Civil Action CV10-03428—First Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., filed on Oct. 29, 2010, 38 pages, with Exhibits A through P.
Document 44. Civil Action CV10-03428—Defendant, David Cheung's Answer to Plaintiff's First Amended Complaint, filed Nov. 11, 2010, 32 pages.
Document 45. Civil Action CV10-03428—Notice of Motion and Motion to Dismiss First Amended Complaint filed by A10 Networks, Inc., Lee Chen, Rajkumar Jalan, Ron Szeto. Motion Hearing set for Feb. 17, 2011 01:30 PM in Courtroom 4, 5th Floor, San Jose, filed Nov. 12, 2010, 34 pages. Included: Proposed Order.
Document 46. Civil Action CV10-03428—Declaration of Scott R. Mosko in Support of Motion to Dismiss First Amended Complaint filed by A10 Networks, Inc., Lee Chen, Rajkumar Jalan, Ron Szeto, filed Nov. 12, 2010, 56 pages, with Exhibits A and B.
Document 65. Civil Action CV10-03428—Memorandum in Opposition re Motion to Dismiss First Amended Complaint filed by Brocade Communications Systems, Inc., Foundry Networks, LLC, filed Jan. 27, 2011, 33 pages.
Document 67. Civil Action CV10-03428—Reply to Opposition re Motion to Dismiss First Amended Complaint filed by A10 Networks, Inc., Lee Chen, Liang Han, Steve Hwang, Rajkumar Jalan, Ron Szeto, filed Feb. 3, 2011, 20 pages.
Document 71. Civil Action CV10-03428—Order by Judge Lucy H. Koh granting in part and denying in part Motion to Dismiss First Amended Complaint, filed Mar. 23, 2011, 19 pages.
Document 75. Civil Action CV10-03428—Second Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Inference with Contract, and Unfair Competition Under Cal. Bus. & Prof. Code §§ 17200 et seq., Filed Apr. 13, 2011, 238 pages, with Exhibits A through P.
Document 85. Civil Action CV10-03428—Third Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Inference with Contract, and Unfair Competition Under Cal. Bus. & Prof. Code §§ 17200 et seq., Filed Apr. 29, 2011, 576 pages, with Exhibits A through T.
Civil Action CV10-03428—A10 Networks, Inc.'s, Lee Chen's, Rajkumar Jalan's, Ron Szeto's, Liang Han's, and Steve Hwang's Answer to Third Amended Complaint, Affirmative Defenses, and A10's Counterclaims, Filed May 16, 2011, 40 pages.
Civil Action CV10-03428—Plaintiffs and Counterclaim Defendants Brocade Communications System, Inc. and Foundry Network, LLC's Answer to Defendant A10 Networks, Inc.'s Counterclaims, Filed May 27, 2011, 12 pages.
Document 95. Civil Action CV10-03428—A10 Networks, Inc.'s Answer to Plaintiffs Brocade Communications Systems, Inc. and Foundry Networks, LLC's Counterclaims, Filed Jun. 17, 2011, 4 pages.
Document 102. Civil Action CV10-03428—Motion to Stay Defendants' Motion to Stay Proceedings Pending Reexaminations filed by A10 Networks, Inc., Lee Chen, Liang Han, Steve Hwang, Rajkumar Jalan, Ron Szeto, filed Jul. 1, 2011, Included: Affidavit Declaration of Scott R. Mosko in Support of Motion; Proposed Order, Exhibits 1 and 2.
Document 109. Civil Action CV10-03428—Opposition to Motion to Stay Proceedings Pending Reexaminations filed by Brocade Communications Systems, Inc., Foundry Networks, LLC, filed Jul. 15, 2011, 20 pages, including Proposed Order.
Document 110. Civil Action CV10-03428—Declaration of Siddhartha M. Venkatesan in Support of Opposition/Response to Motion, Plaintiffs' Opposition to Defendants' Motion to Stay Proceedings filed by Brocade Communications Systems, Inc., Foundry Networks, LLC, filed Jul. 15, 2011, 70 pages, including Exhibits A-E.
Document 119. Civil Action CV10-03428—Reply to Plaintiffs' Opposition to Defendants' Motion to Stay Proceedings Pending Reexaminations filed by A10 Networks, Inc., filed Jul. 22, 2011, 34 pages, including Mosko Declaration, Exhibits A, C, and D.
Document 124. Civil Action CV10-03428—Memorandum in Support of Motion for Temporary Restraining Order and Preliminary Injunction [Redacted Version] filed by Brocade Communications Systems, Inc., Foundry Networks, LLC, filed Jul. 24, 2011, 34 pages, including Proposed Order for Temporary Restraining Order and Order to Show Cause and Proposed Order for Preliminary Injunction.
Document 125. Civil Action CV10-03428—Declaration of Andrew (Andy) Guerrero in Support of Motion for Temporary Restraining Order [Redacted Version] of Plaintiffs' Memorandum in Support of Motion for Temporary Restraining Order and Preliminary Injunction [Redacted Version] of Andrew (Andy) Guerrero ISO Plaintiffs' Motion for TRO and Preliminary Injunction filed by Brocade Communications Systems, Inc., Foundry Networks, LLC, filed Jul. 26, 2011, 3 pages.
Document 126. Civil Action CV10-03428—Declaration of Fabio E. Marino in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 2 pages.
Document 127. Civil Action CV10-03428—Declaration of Keith Stewart in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 5 pages.
Document 128. Civil Action CV10-03428—Declaration of Mani Prasad Kancherla in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 5 pages.

(56) References Cited

OTHER PUBLICATIONS

Document 129. Civil Action CV10-03428—Declaration of Prasad Aluri in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 3 pages.

Civil Action CV10-03428—Declaration of Robert D. Young in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 46 pages, including Redacted Exhibits 1-8.

Civil Action CV10-03428—Declaration of Lisa McGill in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 506 pages. Included: Exhibits 1 through 30. (due to size, this references will be submitted in three parts).

Civil Action CV10-03428—Exhibit 11 to Declaration of Lisa McGill in Support of Motion for Temporary Restraining Order—Foundry Networks Employee Handbook 2005, copyright 2002, 2005, filed Jul. 26, 2011, 52 pages.

Civil Action CV10-03428—Exhibit 22 to Declaration of Lisa McGill in Support of Motion for Temporary Restraining Order—Brocade Communications Systems, Inc. Code of Business Conduct and Ethics, filed Jul. 26, 2011, 13 pages.

Civil Action CV10-03428—Exhibit 27 to Declaration of Lisa McGill in Support of Motion for Temporary Restraining Order—Brocade—IT Equipment Policy, at URL: http://intranet.brocade.com/itcs/kb/Pages/IT%20Equipment%20Policy.aspx, printed on Jul. 31, 2010, filed Jul. 26, 2011, 6 pages.

Civil Action CV10-03428—Exhibit 26 to Declaration of Lisa McGill in Support of Motion for Temporary Restraining Order—Brocade—The Brocade Computing Security Policy, at URL: http://intranet.brocade.com/itcs/kb/Pages/The%20Brocade%20Computing%20Security%2 . . . , printed on Jul. 31, 2010, filed Jul. 26, 2011, 8 pages.

Civil Action CV10-03428—Exhibit 28 to Declaration of Lisa McGill in Support of Motion for Temporary Restraining Order—Brocade Termination and Exit Checklist Form signed by David Cheung on Mar. 15, 2010, filed Jul. 26, 2011, 2 pages.

Document 152. Civil Action CV10-03428—Plaintiffs' Reply Memorandum in Further Support of Motion for Temporary Restraining Order and Preliminary Injunction[Redacted Version] filed by Brocade Communications Systems, Inc., Foundry Networks, LLC, filed Aug. 4, 2011, 22 pages.

Document 160. Civil Action CV10-03428—Notice of Errata re Reply Memorandum in Further Support of Motion for Temporary Restraining Order and Preliminary Injunction by Brocade Communications Systems, Inc., Foundry Networks, LLC, filed Aug. 5, 2011, 2 pages.

Document 161. Civil Action CV10-03428—Notice of Granted Requests for Reexamination of U.S. Pat. Nos. 7,558,195, 7,657,629, 7,840,678, Filed Aug. 5, 2011, 316 pages.

Document 172. Civil Action CV10-03428—Notice of Granted Requests for Reexamination of U.S. Pat. No. 7,584,301, Filed Aug. 12, 2011, 14 pages, including Exhibit A.

Civil Action CV10-03428—Order by Judge Lucy H. Koh denying Motion to Stay; finding as moot Motion to Compel; denying Motion to Qualify Expert Kevin Jeffay Under the Protective Order; granting in part and denying in part Motion for Sanctions; granting Motion to Order A10 to File Confidential Information Under Seal; granting Motion for Leave to File Supplemental Authority, filed Aug. 12, 2011.

Document 177. Civil Action CV10-03428—Order Denying Motion for Temporary Restraining Order [Redacted Version] of Plaintiffs' Memorandum in Support of Motion for Temporary Restraining Order and Preliminary Injunction filed by Brocade Communications Systems, Inc., Foundry Networks, LLC, filed Aug. 16, 2011, 5 pages.

Document 192. Civil Action CV10-03428—Joint Claim Construction, Filed Aug. 26, 2011, 29 pages.

Document 199. Civil Action CV10-03428—Notice of Granted Requests for Reexamination of U.S. Pat. Nos. 7,774,833; 7,454,500; 7,899,899; 7,754,965; 7,647,427; and 7,716,370, Filed Sep. 6, 2011, 141 pages, including Exhibits A through F.

Civil Action CV10-03428—Defendant's A10 Networks, Inc.'s, Lee Chen's, Rajkumar Jalan's, Ron Szeto's, David Cheung's, Liang Han's, and Steven Hwang's Invalidity Contentions, Jun. 27, 2011, 779 pages, Including Exhibits A through M.

Document 212. Civil Action CV10-03428—Notice of Granted Request for Reexamination of U.S. Pat. No. 7,581,009, filed Sep. 27, 2011, 18 pages.

Document 213. Civil Action CV10-03428—Redacted Declaration of David Klausner in Support of Opposition to Plaintiffs' Motion for Temporary Restraining Order and Preliminary Injunction, by A10 Networks, Inc., filed Sep. 28, 2011, 9 pages.

Document 214. Civil Action CV10-03428—Redacted Declaration of Dr. Chi Zhang in Support of Opposition to Plaintiffs' Motion for Temporary Restraining Order and Preliminary Injunction, by A10 Networks, Inc., filed Sep. 28, 2011, 4 pages.

Document 219. Civil Action CV10-03428—Notice of Motion for Partial Summary Judgment on Assignor Estoppel, filed by Brocade Communications Systems, Inc., Foundry Networks, LLC, filed Oct. 11, 2011, 21 pages.

Document 220. Civil Action CV10-03428—Declaration of Teri H.P. Nguyen in Support of Motion for Partial Summary Judgment Notice of Motion and Motion for Partial Summary Judgment on Assignor Estoppel filed by Brocade Communications Systems, Inc., Foundry Networks, LLC, filed Oct. 11, 2011, 259 pages, including Exhibits A-R.

Document 227. Civil Action CV10-03428—Initial Claim Construction Brief, filed by Brocade Communications Systems, Inc., Foundry Networks, LLC, filed Oct. 11, 2011, 31 pages.

Document 234. Civil Action CV10-03428—Declaration of Nitin Gambhir of Brocade Communications Systems, Inc. and Foundry Networks, LLC's Motion for Summary Judgment of Infringement of U.S. Pat. Nos. 7,454,500; 7,581,009; 7,657,629; 7,584,301; 7,840,678; 7,716,370; 7,647,427; and 7,558,195 filed by Brocade Communications Systems, Inc., Foundry Networks, LLC., filed Oct. 11, 2011, 251 pages. Included: Exhibits A through H and Proposed Order.

Document 242. Civil Action CV10-03428—Administrative Motion to File Under Seal Brocade Communications Systems, Inc. and Foundry Networks, LLC's Administrative Motion for Leave to File Under Seal Notice of Errata and Submission of Corrected Brief filed by Brocade Communications Systems, Inc., Foundry Networks, LLC, filed Oct. 13, 2011, 8 pages including Proposed Order and Declaration.

Document 252. Civil Action CV10-03428—Order by Judge Lucy H. Koh denying Motion for Leave to File Excess Pages and Striking Plaintiffs' Motion for Summary Judgment on Infringement, filed Oct. 18, 2011, 2 pages.

Document 263. Civil Action CV10-03428—Declaration of Nitin Gambhir in Support of Brocade Communications, Inc. and Foundry Networks, LLCs Motion for Summary Judgment of Infringement of U.S. Pat. Nos. 7,454,500; 7,581,009; 7,657,629; 7,584,301; and 7,840,678 filed by Brocade Communications Systems, Inc., Foundry Networks, LLC, filed Oct. 21, 2011, 162 pages.

Document 309. Civil Action CV10-03428—Opposition re Motion for Partial Summary Judgment on Assignor Estoppel Defendant and Counterclaimant A10 Networks, Inc.'s, and Defendants Lee Chen's, Rajkumar Jalan's, and Ron Szeto's Opposition to Plaintiffs Brocade Communications Systems, Inc.'s and Foundry Networks, LLC's

(56) References Cited

OTHER PUBLICATIONS

Motion for Partial Summary Judgment on Assignor Estoppel filed by A10 Networks, Inc., Lee Chen, Rajkumar Jalan, Ron Szeto, filed Nov. 8, 2011, 17 pages.
Document 322. Civil Action CV10-03428—Responsive Claim-Construction Brief (PLR 4-5(b)) by A10 Networks, Inc., Lee Chen, Rajkumar Jalan, filed Nov. 15, 2011, 28 pages.
Document 323. Civil Action CV10-03428—Declaration of Scott R. Mosko in Support of Defendant and Counterclaimant A10 Networks, Inc.'s and Defendants Lee Chen's and Rajkumar Jalan's Responsive Claim Construction Brief (PLR 4-5(b)) filed by A10 Networks, Inc., Lee Chen, Rajkumar Jalan, filed Nov. 15, 2011, 70 pages. Included: Exhibits A through F.
Document 324. Civil Action CV10-03428—Declaration of J. Douglas Tygar, Ph.D. in Support of Defendant and Counterclaimant A10 Networks, Inc.'s and Defendants Lee Chen's and Rajkumar Jalan's Responsive Claim Construction Brief (PLR4-5(b)) filed by A10 Networks, Inc., Lee Chen, Rajkumar Jalan, filed on Nov. 15, 2011, 77 pages.
Document 325. Civil Action CV10-03428—Opposition re Motion for Summary Judgment of Noninfringement of U.S. Pat. No. 5,875,185; Motion for Partial Summary Judgment of U.S. Pat. Nos. 7,454,500; 7,581,009; 7,657,629; 7,584,301; and 7,840,678, filed by A10 Networks, Inc., Lee Chen, Rajkumar Jalan, filed Nov. 15, 2011, 20 pages.
Document 326. Civil Action CV10-03428—Declaration of Scott R. Mosko in Support of Defendant and Counterclaimant A10 Networks, Inc.s, and Defendants Lee Chens and Rajkumar Jalans Opposition to Plaintiffs Brocade Communications, Inc. and Foundry Networks, LLCs Motion for Partial Summary Judgment of U.S. Pat. Nos. 7,454,500; 7,581,009; 7,657,629; 7,584,301; and 7,840,678 filed by A10 Networks, Inc., Lee Chen, Rajkumar Jalan, filed Nov. 15, 2011, 16 pages.
Document 332. Civil Action CV10-03428—Administrative Motion to Consider Whether Cases Should be Related, filed by Brocade Communications Systems, Inc., Foundry Networks, LLC, filed Nov. 21, 2011, 8 pages, including Declaration and Proposed Order.
Document 339. Civil Action CV10-03428—Reply Claim Construction Brief filed by Brocade Communications Systems, Inc., Foundry Networks, LLC, filed Nov. 22, 2011, 22 pages.
Document 340. Civil Action CV10-03428—Declaration of Nitin Gambhir in Support of Reply Claim Construction Brief, filed by Brocade Communications Systems, Inc., Foundry Networks, LLC, filed Nov. 22, 2011, 12 pages including Exhibit A.
Document 344. Civil Action CV10-03428—Motion to Stay Defendant and Counterclaimant A10 Networks, Inc.'s and Defendants Lee Chen's Rajkumar Jalan's, Ron Szeto's and Steve Hwang's Renewed Motion to Stay All Proceedings Pending Inter Partes Reexamination (All Patents Asserted by Plaintiffs) filed by A10 Networks, Inc., Lee Chen, Steve Hwang, Rajkumar Jalan, Ron Szeto, filed Nov. 23, 2011, 15 pages. Included: Proposed Order.
Document 345. Civil Action CV10-03428—Declaration of Scott A. Herbst Declaration of Scott A. Herbst in Support of Defendant and Counterclaimant A10 Networks, Inc.s and Defendants Lee Chens, Rajkumar Jalans, Ron Szetos, and Steve Hwangs Renewed Motion to Stay All Proceedings Pending Inter Partes Reexamination (All Patents Asserted by Plaintiffs) filed by A10 Networks, Inc., Lee Chen, Steve Hwang, Rajkumar Jalan, Ron Szeto, filed Nov. 23, 2011, 25 pages, with exhibits 1-6.
Civil Action CV10-03428—Litigation Docket, printed on Oct. 7, 2011, 41 pages.
Document 361. Civil Action CV10-03428—Stipulation Regarding Plaintiffs' Motion for Partial Summary Judgment of Assignor Estoppel, filed Nov. 30, 2011, 2 pages.
Document 380. Civil Action CV10-03428—Brocade's Opposition to Defendant's Motion to Stay Proceedings Pending Reexaminations, filed Dec. 7, 2011, 18 pages.
Document 402. Civil Action CV10-03428—Defendant and Counterclaimant A10 Networks, Inc.'s and Defendants Lee Chen's, Rajkumar Jalan's, Ron Szeto's, and Steve Hwang's Reply in Support of its Renewed Motion to Stay Proceedings Pending Inter Parted Reexaminations (All Patents Asserted by Plaintiffs), Filed Dec. 14, 2011, 11 pages.
Document 425. Civil Action CV10-03428—Defendant and Counterclaimant A10 Networks, Inc.'s Notice of Granted Requests for Inter Partes Reexamination of Plaintiff's U.S. Pat. Nos. 7,558,195; 7,454,500; 7,574,508; and 7,720,977, filed Dec.28, 2011, 3 pages.
Document 426. Civil Action CV10-03428—Defendant and Counterclaimant A10 Networks, Inc.'s Notice of Granted Request for Inter Partes Reexamination of Plaintiff's U.S. Pat. No. 7,581,301, filed Dec. 29, 2012, 3 pages.
Document 434. Civil Action CV10-03428—Order Construing Disputed Claim Terms of U.S. Pat. Nos. 7,647,427; 7,716,370; 7,558,195; 7,454,500; 7,581,009; 7,657,629; 7,584,301; 7,840,678; and 5,875,185, filed Jan. 6, 2012, 33 pages.
Document 447. Civil Action CV10-03428—Defendant and Counterclaimant A10 Networks, Inc.'s Notice of Granted Request for Inter Partes Reexamination of Plaintiff's U.S. Pat. Nos. 7,657,629 and 7,840,678, filed Jan. 20, 2012, 3 pages.
Document 454. Civil Action CV10-03428—Defendant and Counterclaimant A10 Networks, Inc.'s Notice regarding Inter Partes Reexaminations of Plaintiffs' Asserted Patents: (i) Four Newly-Granted Requests (U.S. Pat. Nos. 7,774,833; 7,647,427; 7,716,370; 7,581,009); and (ii) Status Updated for Eleven Already-Instituted Reexaminations (U.S. Pat. Nos. 7,774,833; 7,647,427; 7,716,370; 7,581,009; 7,657,629; 7,840,678; 7,584,301; 7,558,195; 7,454,500; 7,720,977; and 7,574,508), filed Feb. 6, 2012, 4 pages.
Document 470. Civil Action CV10-03428—Defendant and Counterclaimant A10 Networks, Inc.' Notice of Granted Request for Inter Partes Reexamination of Plaintiffs' U.S. Pat. No. 7,756,965 and Status Update, filed Feb. 16, 2012, 3 pages.
Document 592. Civil Action CV10-03428—Order Granting Plaintiffs' Motion for Partial Summary Judgment Dismissing Invalidity Declaratory Relief Counterclaim and Invalidity Affirmative Defense Regarding U.S. Pat. Nos. 7,454,500; 7,581,009; 7,558,195; and 7,774,833, filed Jun. 18, 2012, 20 pages.
Document 45. Civil Action CV10-03428—Notice of Motion and Motion to Dismiss First Amended Complaint filed by A10 Networks, Inc., Lee Chen, Rajkumar Jalan, Ron Szeto, filed Nov. 12, 2010, 34 pages.
Document 220. Civil Action CV10-03428—Declaration of Teri H.P. Nguyen in Support of Motion for Partial Summary Judgment Notice of Motion and Motion for Partial Summary Judgment on Assignor Estoppel, filed by Brocade Communications Systems, Inc., Foundry Networks, LLC, filed Oct. 11, 2011, 259 pages. Included: Exhibits A through R.
Document 242. Civil Action CV10-03428—Administrative Motion to File Under Seal Brocade Communications Systems, Inc. and Foundry Networks, LLC's Administrative Motion for Leave to File Under Seal Notice of Errata and Submission of Corrected Brief, filed by Brocade Communications Systems, Inc., Foundry Networks, LLC, filed Oct. 13, 2011, 8 pages. Included: Proposed Order and Declaration.
Document 161. Civil Action CV10-03428—Defendant and Counterclaimant A10 Networks, Inc.'s Notice of Requests for Reexaminations Granted re U.S. Pat. Nos. 7,558,195; 7,657,629; and 7,840,678, filed Aug. 5, 2011, 3 pages.
Document 231. Civil Action CV10-03428—Defendant and Counterclaimant A10 Networks, Inc.'s Motion for Summary Judgment of Noninfringement of U.S. Pat. Nos. 7,647,427 and 7,716,370, filed Oct. 11, 2011, 14 pages.
Document 232. Civil Action CV10-03428—Declaration of John Chiong in Support of Defendant and Counterclaim-Plaintiff A10 Networks, Inc.'s and Defendants Lee Chen's and Rajkumar Jalan's Motion for Summary Judgment of Noninfringement of U.S. Pat. Nos. 7,647,427 and 7,716,370, filed Oct. 11, 2011, 3 pages.
Document 233. Civil Action CV10-03428—Declaration of Scott A. Herbst in Support of Defendant and Counterclaim-Plaintiff A10 Networks, Inc.'s and Defendants Lee Chen's and Rajkumar Jalan's Motion for Summary Judgment of Noninfringement of U.S. Pat. Nos. 7,647,427 and 7,716,370, filed Oct. 11, 2011, 3 pages.

(56) References Cited

OTHER PUBLICATIONS

Document 303. Civil Action CV10-03428—Declaration of Nitin Gambhir in Support of Brocade Communications Systems, Inc.'s and Foundry Networks, LLC's (1) Motion for Partial Summary Judgment of Infringement of U.S. Pat. Nos. 7,647,427 and 7,716,370 [Filed Under Seal]; (2) Opposition to Defendants' Motion for Summary Judgment of Non-Infringement of U.S. Pat. Nos.7,647,427 and 7,716,370 [Filed Under Seal]; and (3) Opposition to Defendants' Motion for Summary Judgment of Non-Infringement of U.S. Pat. No. 7,558,195 [Filed Under Seal], filed Nov. 8, 2011, 136 pages.

Civil Action CV10-03428—Defendant and Counterclaimant A10 Networks, Inc.'s Reply in Support of Motion for Summary Judgment of U.S. Pat. Nos. 7,647,427 and 7,716,370, filed Nov. 22, 2011, 17 pages.

Document 381. Civil Action CV10-03428—Declaration of Siddhartha M. Venkatesan in Support of Opposition to Motion to Stay Proceedings Pending Reexaminations, filed Dec. 7, 2011, 3 pages.

Document 411. Civil Action CV10-03428—Declaration of Azer Bestavros in Support of Brocade's Claim Construction Brief, filed Dec. 16, 2011, 24 pages.

Document 420. Civil Action CV10-03428—Declaration of Izhak Rubin in Support of Brocade Communications Systems, Inc.'s and Foundry Networks, LLC's: (1) Claim Construction Brief; (2) Opposition to Defendants' Motion for Summary Judgment of Non-Infringement of U.S. Pat. Nos. 7,647,427 and 7,716,370; and (3) Opposition to Defendants' Motion for Summary Judgment of Non-Infringement of U.S. Pat. No. 7,558,195, filed Nov. 18, 2011, 34 pages.

Document 436. Civil Action CV10-03428—Order by Judge Lucy H. Koh Denying A10's Motion for Summary Judgment of Nonlnfringement; Granting Brocade's Motion for Summary Judgment of Nonlnfringement, issued Jan. 6, 2012, 20 pages.

Document 484. Civil Action CV10-03428—A10 Networks, Inc.'s Motion for Leave to File "Notice of Activity Before the Patent Office from the Ongoing Inter Partes and Ex parte Reexaminations of the Asserted Brocade Patents" and Proposed Order, filed Mar. 12, 2012, 10 pages.

Civil Action CV10-03428—Declaration of Scott A. Herbst in Support of A10 Networks, Inc.'s Administrative Motion for Leave to File Notice of Activity Before the Patent Office from the Ongoing Inter Partes and Ex Parte Reexaminations of the Asserted Brocade Patents and Proposed Order, filed Apr. 12, 2012, 70 pages.

Document 486. Civil Action CV10-03428—Order by Hon. Lucy H. Koh granting Motion for Leave to File "Notice of Activity Before the Patent Office From the Ongoing Inter Partes and Ex Parte Reexaminations of the Asserted Brocade Patents," issued Mar. 15, 2012, 5 pages.

Document 514. Civil Action CV10-03428—Declaration of Scott R. Mosko in Support of Defendants A10 Networks, Inc.'s, Lee Chen's, Rajkumar Jalan's, Ron Szeto's and Steve Hwang's Motion for Summary Judgment, filed Apr. 13, 2012, 223 pages.

Document 515. Civil Action CV10-03428—Declaration of Teri H.P. Nguyen in Support of Plaintiffs' Motion for Partial Summary Judgment Dismissing Invalidity Declaratory Relief Counterclaim and Invalidity Affirmative Defense Regarding U.S. Pat. Nos. 7,454,500; 7,581,009; 7,55,195; and 7,774,833, filed May 3, 2012, 23 pages.

Document 516. Civil Action CV10-03428—Exhibit 17 to Declaration of Scott R. Mosko in Support of Defendants A10 Networks, Inc.'s, Lee Chen's, Rajkumar Jalan's, Ron Szeto's and Steve Hwang's Motion for Summary Judgment, filed May 4, 2012, 25 pages.

Document 522. Civil Action CV10-03428—Amended Declaration of Scott R. Mosko in Support of Defendants A10 Networks, Inc.'s, Lee Chen's, Rajkumar Jalan's, Ron Szeto's and Steve Hwang's Motion for Summary Judgment, filed May 7, 2012, 5 pages.

Civil Action CV10-03428—Defendant and Counterclaimant A10 Networks, Inc.'s Notice of Activity in the Ongoing inter partes and ex parte Reexaminations of the Asserted Brocade Patents, filed May 11, 2012, 5 pages.

Document 535. Civil Action CV10-03428—Plaintiff's Objections to Declarations Submitted by A10 Networks, Inc., Lee Chen, Rajkumar Jalan, Ron Szeto and Steve Hwang in Support of Their Motion for Partial Summary Judgment, filed May 17, 2012, 3 pages.

Document 537. Civil Action CV10-03428—Declaration of Elizabeth C. McBride in Support of Plaintiffs Brocade Communications Systems, Inc.'s and Foundry Networks, LLC's Opposition to Defendants' Motion for Summary Judgment, filed May 17, 2012, 135 pages.

Document 538. Civil Action CV10-03428—Declaration of Gary Hemminger in Support of Brocade Communications Systems, Inc.'s and Foundry Networks, LLC's Opposition to Defendants A10 Networks, Inc.'s, Lee Chen's, Rajkumar Jalan's, Ron Szeto's and Steve Hwang's Motion for Summary Judgment, filed May 17, 2012, 3 pages.

Document 539. Civil Action CV10-03428—Defendants A10 Networks, Inc.'s, Lee Chen's, Rajkumar Jalan's, Ron Szeto's and Steve Hwang's Opposition to Plaintiff's Motion for Partial Summary Judgment Dismissing Invalidity Declaratory Relief Counterclaim and Invalidity Defense Regarding U.S. Pat. Nos. 7,454,500, 7,581,009; 7,558,195; and 7,774,833, filed May 17, 2012, 30 pages.

Civil Action CV10-03428—Declaration of Scott R. Mosko in Support of Defendants A10 Networks, Inc.'s, Lee Chen's, Rajkumar Jalan's, Ron Szeto's and Steve Hwang's Opposition to Plaintiff's Motion for Partial Summary Judgment Dismissing Invalidity Declaratory Relief Counterclaim and Invalidity Defense Regarding U.S. Pat. Nos. 7,454,500; 7,581,009; 7,558,195; and 7,774,833, filed May 17, 2012, 13 pages.

Civil Action CV10-03428—Order Granting in Part and Denying in Part A10's Motion for Summary Judgment, Jun. 12, 2012, 36 pages.

Document 592. Civil Action CV10-03428—Order Granting Plaintiffs' Motion for Partial Summary Judgment Dismissing Invalidity Declaratory Relief Counterclaim and Invalidity Affirmative Defense Regarding U.S. Pat. Nos. 7,454,500; 7,581,009; 7,558,195; and 7,774,833, Jun. 18, 2012; 20 pages.

Document 620. Civil Action CV10-03428—Defendant and Counterclaimant A10 Network, Inc.'s Amended Supplemental Claim Construction Brief, filed Jul. 2, 2012, 9 pages.

Document 625. Civil Action CV10-03428—Plaintiff's Supplemental Claim Construction Brief, with Declarations of Azer Bestavros and Izhak Rubin, filed Jul. 3, 2012, 15 pages.

Document 632. Civil Action CV10-03428—Further Claim Construction Order, Jul. 5, 2012, 4 pages.

Civil Action 10-332, Notice of Voluntary Dismissal Without Prejudice, filed on Aug. 5, 2010, 2 pages.

Document 1. Civil Action CV10-03428, Complaint for Patent Infringement, Trade Secret Misappropriation, Breach of Contract, Interference with Prospective Economic Advantage, Interference with Contract, and Unfair Competition Under Cal. Bus. & Prof. Code §§ 17200 et seq., filed on Aug. 4, 2010, with Exhibits A-M, 196 pages.

Document 75. Civil Action CV10-03428, Second Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., with Exhibits A-P, filed on Apr. 13, 2011, 238 pages.

Document 85. Civil Action CV10-03428, Third Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., filed on Apr. 29, 2011, 42 pages.

Document 92. Civil Action CV10-03428, Answer to Third Amended Complaint, Affirmative Defenses, and Counterclaims, filed on May 16, 2011, 40 pages.

(56) References Cited

OTHER PUBLICATIONS

Document 93. Civil Action CV10-03428, Answer to Defendant A10 Networks, Inc.'s Counterclaims, and Counterclaim, filed on May 27, 2011, 12 pages.
Document 141. Civil Action CV10-03428—Notice of Granted Requests for Reexamination of U.S. Pat. Nos. 7,547,508 and 7,270,977 filed Aug. 1, 2011, 31 pages, including Exhibits A and B.
Document 199. Civil Action CV10-03428—Notice of Granted Requests for Reexamination of U.S. Pat. Nos. 7,774,833; 7,454,500; 7,899,899; 7,754,965; 7,647,427; and 7,716,370, Filed Sep. 6, 2011, 72 pages, including Exhibits A through F.
Civil Action CV10-03428, Expert Report of J. Douglas Tygar in Support of Defendant and Counterclaimant A10 Networks, Inc.'s, and Defendant Lee Chen's and Rajkumar Jalan's Invalidity Contentions, filed Mar. 23, 2012, 81 pages.
Ex Parte Reexamination Interview Summary for Reexamination Control No. 90/011,772 mailed on Nov. 29, 2011, 58 pages.
Declaration of James E. Mrose, entered as Exhibit Q in *Brocade Communications Systems, Inc.* v. *A10 Networks, Inc.*, Civil Action CV10-03428, Mar. 21, 2012, 4 pages.
Civil Action CV10-03428, Transcript of the Deposition of Kevin Delgadillo, taken Mar. 14, 2012, 12 pages.
Document 771. Civil Action CV10-03428, Verdict Form filed Aug. 6, 2012, 7 pages.
Document 1026. Civil Action CV10-03428, Revised Stipulated Final Judgment filed Jun. 10, 2013, 9 pages.
Transmittal of Communication to Third Party Requester Inter Partes Reexamination—Notice of Intent to Issue Inter Partes Reexamination Certificates for Reexamination Control No. 95/001,807, dated Aug. 18, 2015, 11 pages.
Confirmation of Hearing by Appellant for Reexamination Control No. 95/001,806, dated Aug. 28, 2015, 5 pages.
Examiner's Answer to Appeal Brief, dated Sep. 11, 2015, for U.S. Appl. No. 10/674,627, filed Sep. 29, 2003, 25 pages.
Reexamination Certificate Issued for Control No. 95/001,807 dated Sep. 22, 2015, 2 pages.
Non-Final Office Action, dated Sep. 30, 2015, for U.S. Appl. No. 12/506,137, filed Jul. 20, 2009, 23 pages.
Patent Board Decision—Examiner Affirmed in Part—Control No. 95/001,806, dated Sep. 30, 2015, 18 pages.
Patent Trial and Appeal Board Docketing Notice, dated Nov. 12, 2015, for U.S. Appl. No. 10/674,627, filed Sep. 29, 2003, 2 pages.
Order Remanding Inter Partes Reexamination for Control No. 95/001,806, dated Dec. 31, 2015, 3 pages.
Record of Oral Hearing Held Sep. 15, 2015 for Control No. 95/001,806, dated Jan. 6, 2016, 20 pages.
Record of Oral Hearing Held Jul. 22, 2015 for Control No. 95/001,806, dated Jan. 6, 2016, 65 pages.
Final Office Action, dated Feb. 17, 2016, for U.S. Appl. No. 12/506,137, filed Jul. 20, 2009, 14 pages.
Ivy Pei-Shan Hsu, "Inter Partes Reexamination Certificate (1256th)," U.S. Pat. No. 7,454,500 C2, Apr. 4, 2016, 2 pages.

* cited by examiner

GLOBAL SERVER LOAD BALANCING

CROSS-REFERENCES TO RELATED APPLICATIONS

The present application is a continuation of U.S. application Ser. No. 12/496,560, filed Jul. 1, 2009, now U.S. Pat. No. 8,504,721, issued Aug. 6, 2013, titled Global Server Load Balancing, which is a continuation of U.S. application Ser. No. 11/741,480, filed Apr. 27, 2007 titled Global Server Load Balancing, now U.S. Pat. No. 7,581,009 issued Aug. 25, 2009, which is a continuation of U.S. application Ser. No. 09/670,487 filed Sep. 26, 2000 titled Global Server Load Balancing, now U.S. Pat. No. 7,454,500 issued Nov. 18, 2008. The entire contents of the aforementioned applications are herein incorporated by reference in their entirety for all purposes.

BACKGROUND

1. Field of the Invention

The present invention relates to load balancing among servers. More particularly, the present invention relates to achieving load balancing by, in response to resolving a DNS query by a client, providing the address of a server that is expected to serve the client with a high performance in a given application.

2. Description of the Related Art

Under the TCP/IP protocol, when a client provides a symbolic name ("URL") to request access to an application program or another type of resource, the host name portion of the URL needs to be resolved into an IP address of a server for that application program or resource. For example, the URL (e.g., http://www.foundrynet.com/index.htm) includes a host name portion www.foundrynet.com that needs to be resolved into an IP address. The host name portion is first provided by the client to a local name resolver, which then queries a local DNS server to obtain a corresponding IP address. If a corresponding IP address is not locally cached at the time of the query, or if the "time-to-live" (TTL) of a corresponding IP address cached locally has expired, the DNS server then acts as a resolver and dispatches a recursive query to another DNS server. This process is repeated until an authoritative DNS server for the domain (i.e. foundrynet.com, in this example) is reached. The authoritative DNS server returns one or more IP addresses, each corresponding to an address at which a server hosting the application ("host server") under the host name can be reached. These IP addresses are propagated back via the local DNS server to the original resolver. The application at the client then uses one of the IP addresses to establish a TCP connection with the corresponding host server. Each DNS server caches the list of IP addresses received from the authoritative DNS for responding to future queries regarding the same host name, until the TTL of the IP addresses expires.

To provide some load sharing among the host servers, many authoritative DNS servers use a simple round-robin algorithm to rotate the IP addresses in a list of responsive IP addresses, so as to distribute equally the requests for access among the host servers.

The conventional method described above for resolving a host name to its IP addresses has several shortcomings. First, the authoritative DNS does not detect a server that is down. Consequently, the authoritative DNS server continues to return a disabled host server's IP address until an external agent updates the authoritative DNS server's resource records. Second, when providing its list of IP addresses, the authoritative DNS sever does not take into consideration the host servers' locations relative to the client. The geographical distance between the server and a client is a factor affecting the response time for the client's access to the host server. For example, traffic conditions being equal, a client from Japan could receive better response time from a host server in Japan than from a host server in New York. Further, the conventional DNS algorithm allows invalid IP addresses (e.g., that corresponding to a downed server) to persist in a local DNS server until the TTL for the invalid IP address expires.

BRIEF SUMMARY

The present invention provides an improved method and system for serving IP addresses to a client, based on a selected set of performance metrics. In accordance with this invention, a global server load-balancing (GSLB) switch is provided as a proxy for an authoritative DNS server, together with one or more site switches each associated with one or more host servers. Both the GSLB switch and the site switch can be implemented using the same type of switch hardware. Each site switch provides the GSLB switch with current site-specific information regarding the host servers associated with the site switch. Under the present invention, when an authoritative DNS server resolves a host name in a query and returns one or more IP addresses, the GSLB switch filters the IP addresses using the performance metrics compiled from the site-specific information collected from the site switches. The GSLB switch then returns a ranked or weighted list of IP addresses to the inquirer. In one embodiment, the IP address that is estimated to provide the best expected performance for the client is placed at the top of the list. Examples of suitable performance metrics include availability metrics (e.g., a server's or an application's health), load metrics (e.g., a site switch's session capacity or a corresponding preset threshold), and proximity metrics (e.g., a round-trip time between the site switch and a requesting DNS server, the geographic location of the host server, the topological distance between the host server and the client program). (A topological distance is the number of hops between the server and the client). Another proximity metrics is the site switch's "flashback" speed (i.e., how quickly a switch receives a health check result). The ordered list can also be governed by other policies, such as the least selected host server.

The present invention is better understood upon consideration of the detailed description of the preferred embodiments below, in conjunction with the accompanying drawings.

DETAILED DESCRIPTION

Figure 1:
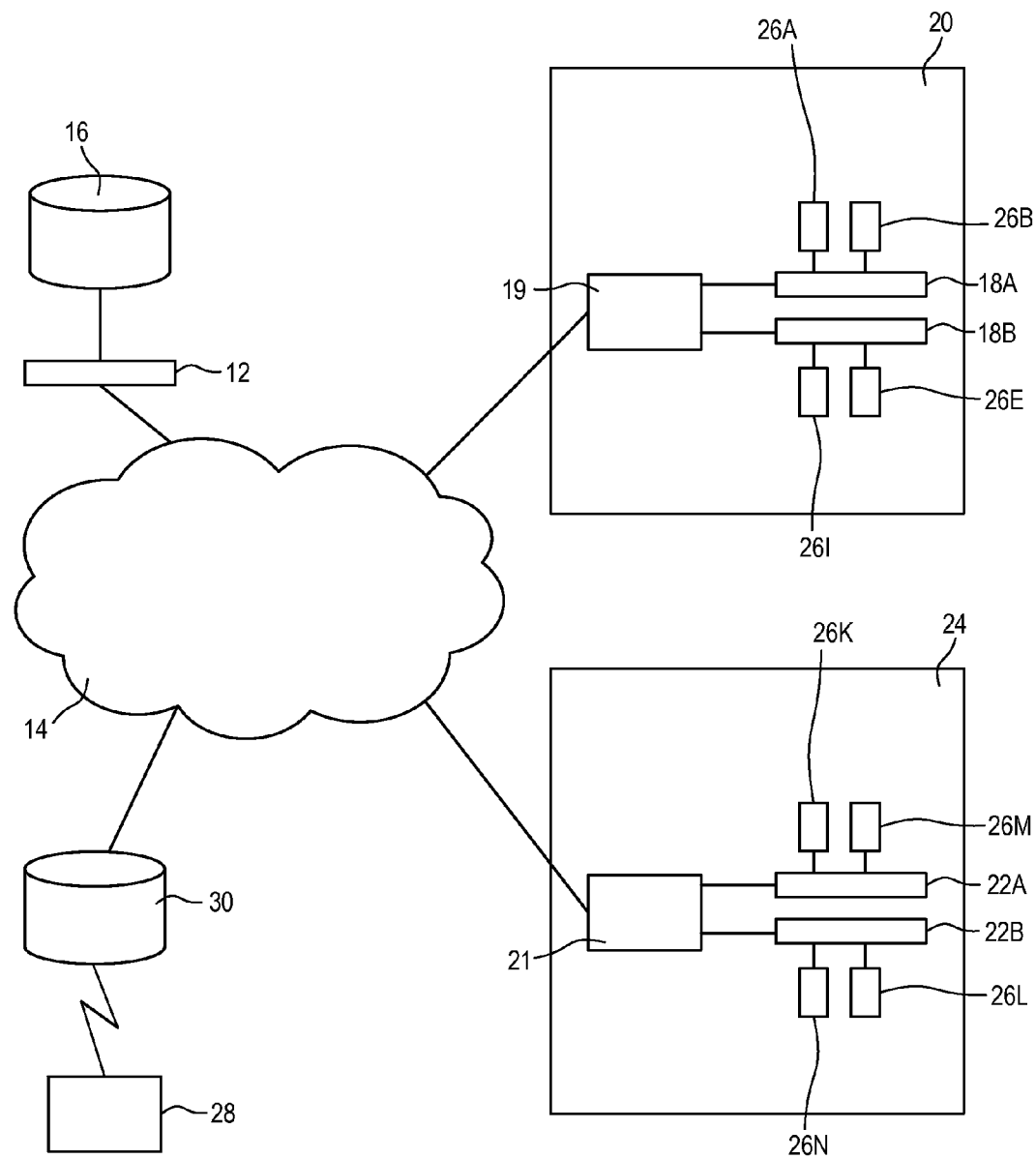
FIG. 1 illustrates a global server load balancing configuration.

FIG. 1 illustrates one embodiment of the present invention that provides a global server load balancing configuration. As shown in FIG. 1, global server load balancing (GSLB) switch 12 is connected to Internet 14 and acts as a proxy to an authoritative Domain Name System (DNS) server 16 for the domain "foundrynet.com" (for example). That is, while the actual DNS service is provided by DNS server 16, the IP address known to the rest of the Internet for the authoritative DNS sever of the domain "foundrynet. com" is a virtual IP address configured on GSLB switch 12. Of course, DNS server 16 can also act simultaneously as an authoritative DNS for other domains. GSLB switch 12 communicates, via Internet 14, with site switches 18A and 18B at site 20, site switches 22A and 22B at site 24, and any other similarly configured site switches. Site switch 18A, 18B, 22A and 22B are shown, for example, connected to routers 19 and 21 respectively and to servers 26A, . . . , 26I, . . . 26N. Some or all of servers 26A, . . . , 26I, . . . , 26N may host application server programs (e.g., http and ftp) relevant to the present invention. These host servers are reached through site switches 18A, 18B, 22A and 22B using one or more virtual IP addresses configured at the site switches, which act as proxies to the host servers. A suitable switch for implementing either GSLB switch 12 or any of site switches 18A, 18B, 22A and 22B is the "ServerIron" product available from Foundry Networks, Inc.

FIG. 1 also shows client program 28 connected to Internet 14, and communicates with local DNS server 30. When a browser on client 28 requests a web page, for example, using a Universal Resource Locator (URL), such as http://www.foundrynet.com/index.htm, a query is sent to local DNS server 30 to resolve the symbolic host name www.foundrynet.com to an IP address of a host server. The client program receives from DNS server 30 a list of IP addresses corresponding to the resolved host name. This list of IP addresses is either retrieved from local DNS server 30's cache, if the TTL of the responsive IP addresses in the cache has not expired, or obtained from GSLB switch 12, as a result of a recursive query. Unlike the prior art, however, this list of IP addresses are ordered by GSLB switch 12 based on performance metrics described in further detail below. In the remainder of this detailed description, for the purpose of illustrating the present invention only, the list of IP addresses returned are assumed to be the virtual IP addresses configured on the proxy servers at switches 18A, 18B, 22A and 22B (sites 20 and 24). In one embodiment, GSLB switch 12 determines which site switch would provide the best expected performance (e.g., response time) for client 28 and returns the IP address list with a virtual IP address configured at that site switch placed at the top. (Within the scope of the present invention, other forms of ranking or weighting the IP addresses in the list can also be possible.) Client program 28 can receive the ordered list of IP addresses, and typically selects the first IP address on the list to access the corresponding host server.

Figure 3:
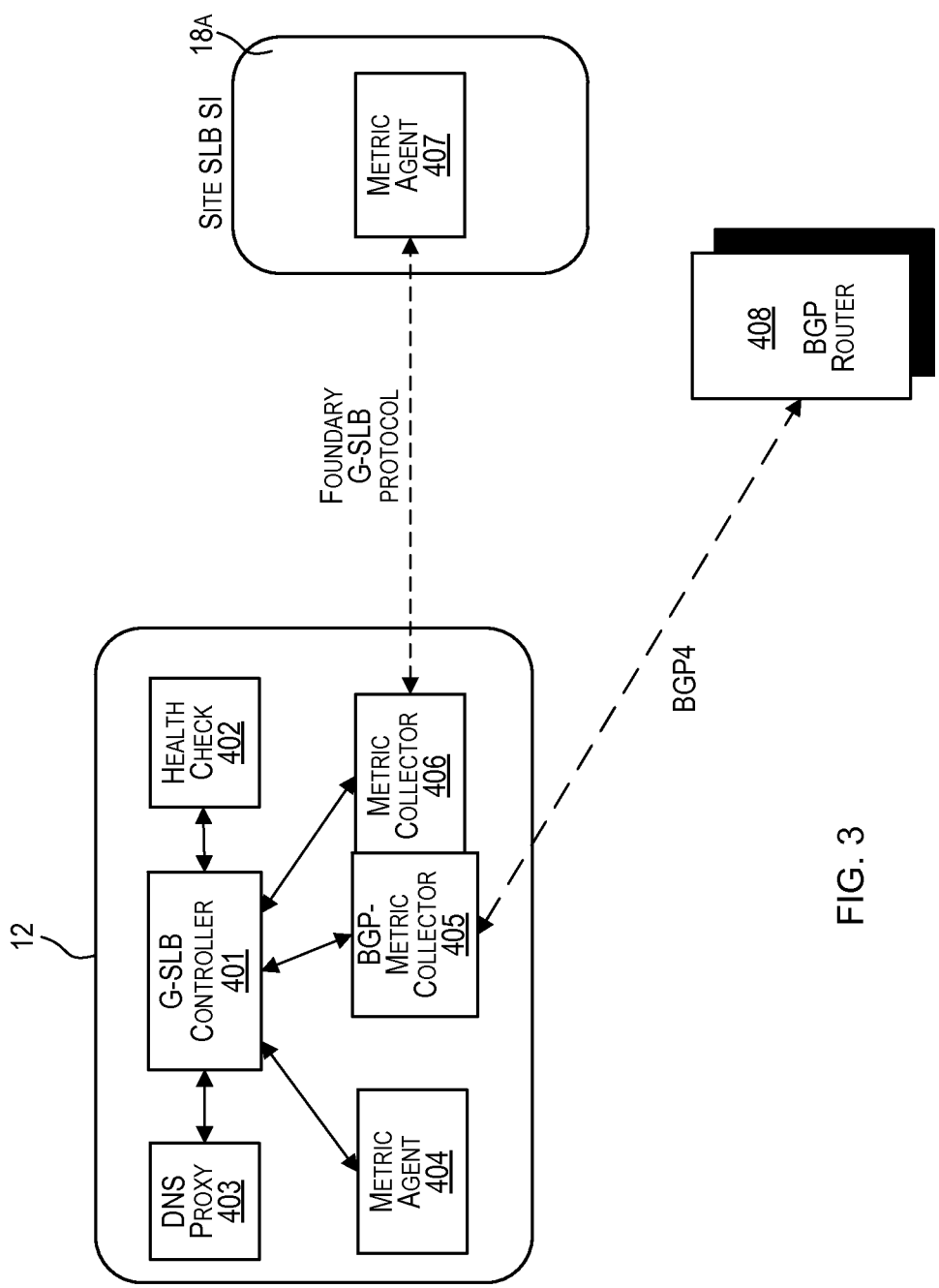
FIG. 3 is a block diagram showing the functional modules of GSLB switch 12 and site switch 18a relevant to the global server load balancing function.

FIG. 3 is a block diagram showing the functional modules of GSLB switch 12 and site switch 18a relevant to the global server load balancing function. As shown in FIG. 3, GSLB 12 includes a GSLB switch controller 401, health check module 402, DNS proxy module 403, metric agent 404, routing metric collector 405, and site-specific metric collector 406. GSLB switch controller 401 provides general control functions for the operation of GSLB switch 12. Health check module 402 is responsible for querying, either periodically or on demand, host servers and relevant applications hosted on the host servers to determine the "health" (i.e., whether or not it is available) of each host server and each relevant application. Site-specific metric collector 406 communicates with metric agents in site-specific switches (e.g., FIG. 3 shows site-specific metric collector 406 communicating with site-specific metric agent 407) to collect site-specific metrics (e.g., number of available sessions on a specific host server). Similarly, routing metric collector 405 collects routing information from routers (e.g., topological distances between nodes on the Internet). FIG. 3 shows, for example, router 408 providing routing metric collector 405 with routing metrics (e.g., topological distance between the load balancing switch and the router), using the Border Gateway Protocol (BGP). DNS proxy module 403 (a) receives incoming DNS requests, (b) provides the host names to be resolved to DNS server 16, (c) receives from DNS server 16 a list of responsive IP addresses, (d) orders the IP addresses on the list received from DNS server 16 according to the present invention, using the metrics collected by routing-metric collector 405 and site specific collector 406, and values of any other relevant parameter, and (e) provides the ordered list of IP addresses to the requesting DNS server. Since GSLB switch 12 can also act as a site switch, GSLB switch 12 is provided site-specific metric agent 404 for collecting metrics for a site-specific metric collector.

In one embodiment, the metrics used in a GSLB switch includes (a) the health of each host server and selected applications, (b) each site switch's session capacity threshold, (c) the round trip time (RTT) between a site switch and a client in a previous access, (d) the geographical location of a host server, (e) the current available session capacity in each site switch, (f) the "flashback" speed between each site switch and the GSLB switch (i.e., how quickly each site switch responds to a health check from the GSLB switch), and (g) a policy called the "Least Response selection" (LRS) which prefers the site least selected previously. Many of these performance metrics can be provided default values. Each individual metric can be used in any order and each metric can be disabled. In one embodiment, the LRS metric is always enabled.

Figure 2:
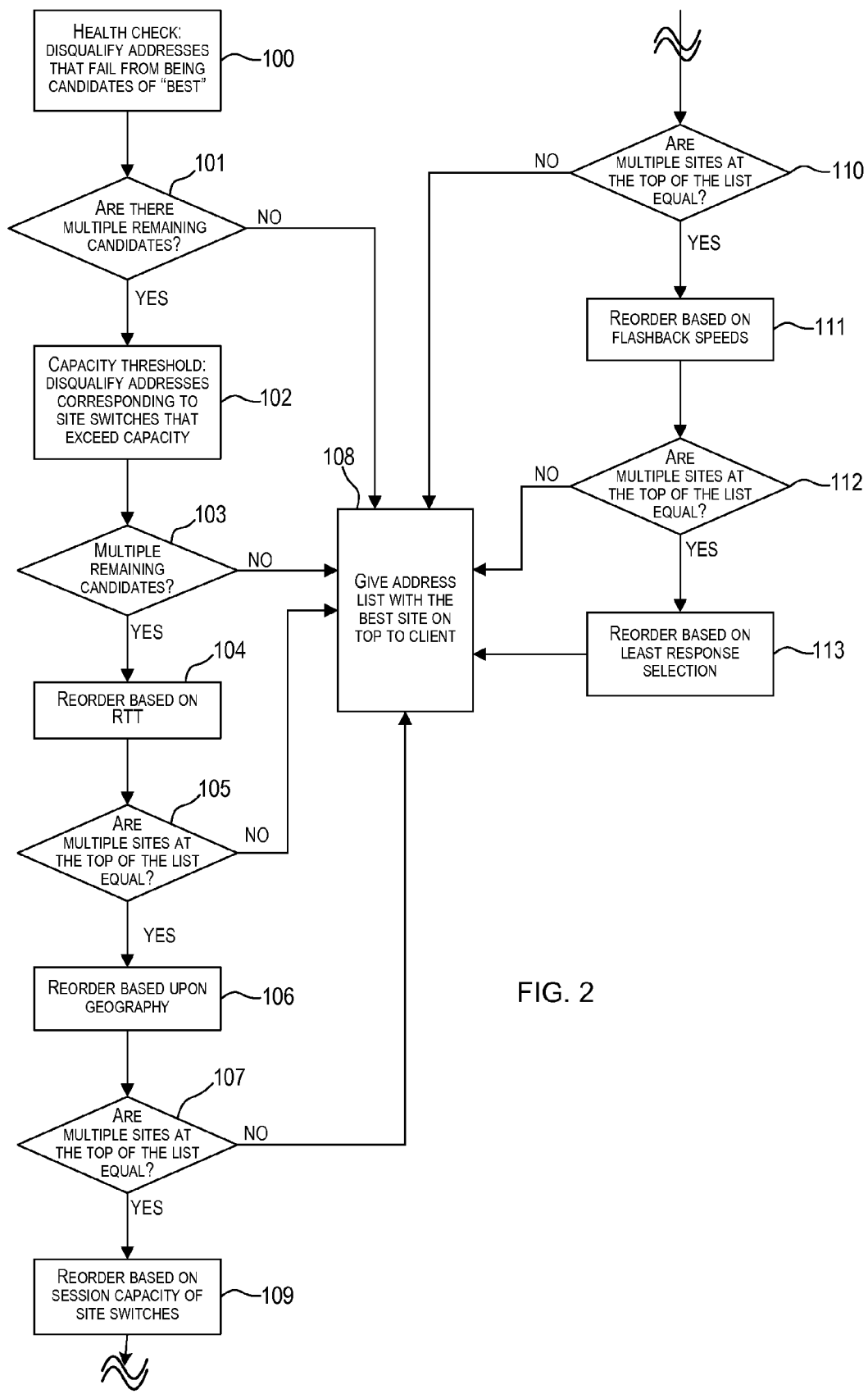
FIG. 2 illustrates in a flow chart one embodiment of the algorithm for selecting the "best" address from the list of addresses supplied by the authoritative DNS.

FIG. 2 illustrates in a flow diagram one embodiment of an optimization algorithm utilized by GSLB switch 12 to process the IP address list received from DNS server 16, in response to a query resulting from client program 28. As shown in FIG. 2, in act 100, upon receiving the IP address list from DNS server 16, GSLB switch 12 performs, for each IP address on the IP address list (e.g., host server 26I connected to site switch 18B), a layer 4 health check and a layer 7 check. Here, layers 4 and 7 refer respectively to the transport and application protocols in the Open System Interconnection (OSI) protocol layers. The layer 4 health check can be a Transmission Control Protocol (TCP) health check or a User Datagram Protocol (UDP) health check. Such a health check can be achieved, for example, by a "ping-like" operation defined under the relevant protocol. For example, under the TCP protocol, a TCP SYN packet can be sent, and the health of the target is established when a corresponding TCP ACK packet is received back from the target. In this embodiment, the layer 7 health check is provided for specified applications, such as the well-known HyperText Transport Protocol (HTTP) and the File Transfer Protocol (FTP) applications. If a host server or an associated application fails any of the health checks it is disqualified (act 102) from being the "best" site and may be excluded from the IP address list to be returned to client program 28. Since the health check indicates whether or not a host server or an associated application is available, the health check metric is suitable for use to eliminate an IP address from the candidates for the "best" IP address (i.e., the host server expected to provide the highest performance). After act 100, if the list of IP addresses consists of only one IP address (act 101), the list of IP addresses is returned to client program 28 at act 108.

After act 100, if the list of candidate IP addresses for the best site consists of multiple IP addresses, it is further assessed in act 102 based upon the capacity threshold of the site switch serving that IP address. Each site switch may have a different maximum number of TCP sessions it can serve. For example, the default number for the "ServerIron" product of Foundry Network is one million sessions, although it can be configured to a lower number. The virtual IP address configured at site switch 18B may be disqualified from being the "best" IP address if the number of sessions for switch 18B exceed a predetermined threshold percentage (e.g., 90%) of the maximum number of sessions. (Of course, the threshold value of 90% of the maximum capacity can be changed.) After act 102, if the list of IP addresses consists of only one IP address (act 103), the list of IP addresses is returned to client program 28 at list 108.

After act 102, if the IP address list consists of multiple IP addresses (act 103), the remaining IP addresses on the list can then be reordered in act 104 based upon a round-trip time (RTT) between the site switch for the IP address (e.g., site switch 18B) and the client (e.g., client 28). The RTT is computed for the interval between the time when a client machine requests a TCP connection to a proxy server configured on a site switch, sending the proxy server a TCP SYN packet, and the time a site switch receives from the client program a TCP ACK packet. (In response to the TCP SYN packet, a host server sends a TCP SYN ACK packet, to indicate acceptance of a TCP connection; the client machine returns a TCP ACK packet to complete the setting up of the TCP connection.) The GSLB Switch (e.g., GSLB switch 12) maintains a database of RTT, which it creates and updates from data received periodically from the site switches (e.g., site switches 18A, 18B, 22A and 22B). Each site collects and stores RTT data for each TCP connection established with a client machine. In one embodiment, the GSLB switch favors one host server over another only if the difference in their RTTs with a client machine is greater than a specified percentage, the default specified percentage value being 10%. To prevent bias, the GSLB) switch ignores, by default, RTT values for 5% of client queries from each responding network. After act 105, if the top entries on the list of IP addresses do not have equal RTTs, the list of IP addresses is returned to client program 28 at act 108.

If multiple sites have equal RTTs then the list is reordered in act 106 based upon the location (geography) of the host server. The geographic location of a server is determined according to whether the IP address is a real address or a virtual IP address ("VIP"). For a real IP address the geographical region for the host server can be determined from the IP address itself. Under IANA, regional registries RIPE (Europe), APNIC (Asia/Pacific Rim) and ARIN (the Americas and Africa) are each assigned different prefix blocks. In one embodiment, an IP address administered by one of these regional registries is assumed to correspond to a machine located inside the geographical area administered by the regional registry. For a VIP, the geographic region is determined from the management IP address of the corresponding site switch. Of course, a geographical region can be prescribed for any IP address to override the geographic region determined from the procedure above. The GSLB Switch prefers an IP address that is in the same geographical region as the client machine. At act 107, if the top two entries on the IP list are not equally ranked, the IP list is sent to the client program 28 at act 108.

After act 106, if multiple sites are of equal rank for the best site, the IP addresses can then be reordered based upon available session capacity (act 109). For example, if switch 18A has 1,000,000 sessions available and switch 22B has 800,000 sessions available, switch 18A is then be preferred, if a tolerance limit, representing the difference in sessions available expressed as a percentage of capacity in the larger switch, is exceeded. For example, if the tolerance limit is 10%, switch 18A will have to have at a minimum 100,000 more sessions available than switch 22B to be preferred. If an IP address is preferred (act 110), the IP address will be placed at the top of the IP address list, and is then returned to the requesting entity at act 108. Otherwise, if the session capacity does not resolve the best IP address, act 111 then attempts to a resolution based upon a "flashback" speed. The flashback speed is a time required for a site switch to respond to layers 4 and 7 health checks by the GSLB switch. The flashback speed is thus a measure of the load on the host server. Again, the preferred IP address will correspond to a flashback speed exceeding the next one by a preset tolerance limit.

In one embodiment, flashback speeds are measured for well-known applications (layer 7) and their corresponding TCP ports (layer 4). For other applications, flashback speeds are measured for user selected TCP ports. Layer 7 (application-level) flashback speeds are compared first, if applicable. If the application flashbacks fail to provide a best IP address, layer 4 flashback speeds are compared. If a host server is associated with multiple applications, the GSLB switch selects the slowest response time among the applications for the comparison. At act 112, if a best IP address is resolved, the IP address list is sent to client program 28 at act 108. Otherwise, at act 113, an IP address in the site that is least often selected to be the "best" site is chosen. The IP address list is then sent to client program 28 (act 108).

Upon receipt of the IP address list, the client's program uses the best IP address selected (i.e., the top of the list) to establish a TCP connection with a host server. Even then, if there is a sudden traffic surge that causes a host server to be overloaded, or if the host servers or the applications at the site become unavailable in the mean time, the site switch can redirect the TCP connection request to another IP address using, for example, an existing HTTP redirection procedure. The present invention does not prevent a site switch from performing load balancing among host servers within its sub-network by redirection using a similar mechanism.

To provide an RTT under the present invention described above, at the first time a client accesses an IP address, a site switch (e.g., site switch 22A of FIG. 2) monitors the RTT time—the time difference between receiving a TCP SYN and a TCP ACK for the TCP connection—and records it in an entry of the cache database. The RTT time measured this way corresponds to the natural traffic flow between the client machine and the host sever specified, rather than an artificial RTT based on "pinging" the client machine under a standard network protocol. Periodically, the site switches report the RTT database to a GSLB switch along with load conditions (e.g., number of sessions available). The GSLB switch aggregates the RTTs reported into a proximity table indexed by network neighborhood. (A network neighborhood is the portion of a network sharing a prefix of an IP address.) The GSLB switch can thus look up the RTT for a client machine to any specific host server, based on the client's network neighborhood specified in the client's IP address. From the accesses to the host servers from a large number of network neighborhoods, the GSLB switch can build a comprehensive proximity knowledge database that enables smarter site selection. In order to keep the proximity table useful and up-to-date, the GSLB switch manages the proximity table with cache management policies (e.g., purging infrequently used entries in favor of recently obtained RTTs). The proximity data can be used for all IP addresses served by each site switch.

While particular embodiments of the present invention have been shown and described it will be apparent to those skilled in the art that changes and modifications may be made without departing from this invention in its broader aspect and, therefore, the appended claims are to encompass within their scope all such changes and modifications.

What is claimed is:

1. A method comprising:
    receiving, by a network device from a domain name server, a plurality of network addresses generated by the domain name server in response to a domain name query originated by a client machine;
    determining, by the network device, based upon a first metric associated with a plurality of sites, that a single network address from the plurality of network addresses is not better than all other network addresses in the plurality of network addresses for responding to the domain name query;
    responsive to the determining, processing, by the network device, one or more network addresses from the plurality of network addresses using a second metric associated with the plurality of sites, wherein the second set metric is different from the first metric; and
    causing, by the network device, a list of multiple network addresses from the plurality of network addresses to be forwarded to the client machine.

2. The method of claim 1 wherein the first metric is round trip times associated with the plurality of sites, wherein the round trip time associated with a site is indicative of time for exchanging a message between a switch at the site and the client machine.

3. The method of claim 1 further comprising:
    determining, by the network device, that the processing using the second metric does not yield a single network address as better than other network addresses in the plurality of network addresses for responding to the domain name query;
    processing, by the network device, one or more network addresses from the plurality of network addresses using a third metric associated with the plurality of sites, wherein the third metric is different from the first metric and the second metric.

4. The method of claim 1 wherein:
    processing the one or more network addresses from the plurality of network addresses using the second metric comprises generating an ordered list of multiple network addresses from the plurality of network addresses;
    the causing comprises causing the ordered list of multiple network addresses from the plurality of network addresses to be forwarded to the client machine.

5. The method of claim 1 wherein the plurality of network addresses comprises a first virtual IP address configured at a host server site switch at a first site from the plurality of sites, the host server site switch associated with one or more host servers at the first site, the one or more host servers being reachable via the host server site switch, the method further comprising:
    receiving, by the network device, information related to the first metric information and information related to the second metric for the first network address from the host server site switch; and
    wherein the determining comprises processing the plurality of network addresses based upon the first metric comprises using the information related to the first metric;
    wherein processing the one or more network addresses using the second metric comprises using the information related to the second metric.

6. A network device comprising:
    a memory; and
    processor;
    wherein the network device is configurable to:
        receive, from a domain name server, a plurality of network addresses generated by the domain name server in response to a domain name query originated by a client machine;
        determine, based upon a first metric associated with a plurality of sites, that a single network address from the plurality of network addresses is not better than all other network addresses in the plurality of network addresses for responding to the domain name query;
        process one or more network addresses from the plurality of network addresses using a second metric associated with the plurality of sites, wherein the second set metric is different from the first metric; and
        cause a list of multiple network addresses from the plurality of network addresses to be forwarded to the client machine.

7. The network device of claim 5 wherein the first metric is round trip times associated with the plurality of sites, wherein the round trip time associated with a site is indicative of time for exchanging a message between a switch at the site and the client machine.

8. The network device of claim 5 further configurable to:
    determine that the processing using the second metric does not yield a single network address as better than other network addresses in the plurality of network addresses for responding to the domain name query; and
    process one or more network addresses from the plurality of network addresses using a third metric associated with the plurality of sites, wherein the third metric is different from the first metric and the second metric.

9. The network device of claim 5 further configurable to:
    generate an ordered list of multiple network addresses from the plurality of network addresses as a result of processing performed using the second metric; and
    cause the ordered list of multiple network addresses to be forwarded to the client machine.

* * * * *